United States Patent
Shim et al.

(10) Patent No.: US 11,182,383 B1
(45) Date of Patent: *Nov. 23, 2021

(54) SYSTEM AND METHOD FOR DATA COLLECTION TO VALIDATE LOCATION DATA

(71) Applicant: PLACED, LLC, New York, NY (US)

(72) Inventors: David Shim, Seattle, WA (US); Brad Bicknell, Seattle, WA (US); George Varghese, Kirklan, WA (US); Nick Gerner, Seattle, WA (US); Weilie Yi, Bellevue, WA (US)

(73) Assignee: PLACED, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/190,997

(22) Filed: Nov. 14, 2018

Related U.S. Application Data

(60) Continuation of application No. 13/892,201, filed on May 10, 2013, now Pat. No. 10,204,137, which is a division of application No. 13/405,182, filed on Feb. 24, 2012, now Pat. No. 8,972,357.

(51) Int. Cl.
| | |
|---|---|
| *G06F 16/245* | (2019.01) |
| *H04W 4/00* | (2018.01) |
| *G06F 16/29* | (2019.01) |
| *H04W 4/029* | (2018.01) |

(52) U.S. Cl.
CPC ............ *G06F 16/245* (2019.01); *G06F 16/29* (2019.01); *H04W 4/029* (2018.02)

(58) Field of Classification Search
CPC ........ G06F 16/245; G06F 16/29; H04W 4/02; H04W 4/021; H04W 4/029; H04W 4/025; H04W 4/04
See application file for complete search history.

(56) References Cited

U.S. PATENT DOCUMENTS

| | | |
|---|---|---|
| 666,223 A | 1/1901 | Shedlock |
| 4,581,634 A | 4/1986 | Williams |
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |

(Continued)

FOREIGN PATENT DOCUMENTS

| | | |
|---|---|---|
| CA | 2887596 A1 | 7/2015 |
| EP | 2051480 A1 | 4/2009 |

(Continued)

OTHER PUBLICATIONS

"A Whole New Story", Snap, Inc., URL: https://www.snap.com/en-US/news/, (2017), 13 pgs.

(Continued)

*Primary Examiner* — Magdi Elhag

(57) ABSTRACT

A data collection system that provides the means to collect, store and make data available for a location analytics inference pipeline. The system incorporates a feedback mechanism enabling algorithms produced from the inference pipeline to drive the collection strategy to yield higher data quality and to produce reference data for model validation.

20 Claims, 17 Drawing Sheets

(56) References Cited

U.S. PATENT DOCUMENTS

| | | |
|---|---|---|
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,485 B1 | 9/2002 | Anzil |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,587,053 B1 | 9/2009 | Pereira |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,966,658 B2 | 6/2011 | Singh et al. |
| 8,001,204 B2 | 8/2011 | Burtner et al. |
| 8,010,685 B2 | 8/2011 | Singh et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,200,247 B1 | 6/2012 | Starenky et al. |
| 8,208,943 B2 | 6/2012 | Petersen |
| 8,214,443 B2 | 7/2012 | Hamburg |
| 8,220,034 B2 | 7/2012 | Hahn et al. |
| 8,229,458 B2 | 7/2012 | Busch |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,296,842 B2 | 10/2012 | Singh et al. |
| 8,301,159 B2 | 10/2012 | Hamynen et al. |
| 8,301,639 B1 | 10/2012 | Myllymaki et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,509,761 B2 | 8/2013 | Krinsky et al. |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,588,942 B2 | 11/2013 | Agrawal |
| 8,594,680 B2 | 11/2013 | Ledlie et al. |
| 8,613,088 B2 | 12/2013 | Varghese et al. |
| 8,613,089 B1 | 12/2013 | Holloway et al. |
| 8,624,725 B1 | 1/2014 | MacGregor |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |

(56) References Cited

U.S. PATENT DOCUMENTS

| | | |
|---|---|---|
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,942,953 B2 | 1/2015 | Yuen et al. |
| 8,972,357 B2 * | 3/2015 | Shim .................. G06F 16/245 707/690 |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,256,832 B2 | 2/2016 | Shim et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,204,137 B2 * | 2/2019 | Shim .................. G06F 16/29 |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244633 A1 | 10/2007 | Phillips et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschwieler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0189360 A1 | 8/2008 | Kiley et al. |
| 2008/0207176 A1 | 8/2008 | Brackbill et al. |

(56) References Cited

U.S. PATENT DOCUMENTS

| | | |
|---|---|---|
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0249983 A1 | 10/2008 | Meisels et al. |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0005987 A1 | 1/2009 | Vengroff et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089558 A1 | 4/2009 | Bradford et al. |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0204354 A1 | 8/2009 | Davis et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0276235 A1 | 11/2009 | Benezra et al. |
| 2009/0278738 A1 | 11/2009 | Gopinath |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0041378 A1 | 2/2010 | Aceves et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161720 A1 | 6/2010 | Colligan et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0211425 A1 | 8/2010 | Govindarajan |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0223346 A1 | 9/2010 | Dragt |
| 2010/0250109 A1 | 9/2010 | Johnston et al. |
| 2010/0257036 A1 | 10/2010 | Khojastepour et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0076653 A1 | 3/2011 | Culligan et al. |
| 2011/0083101 A1 | 4/2011 | Sharon et al. |
| 2011/0099046 A1 | 4/2011 | Weiss et al. |
| 2011/0099047 A1 | 4/2011 | Weiss |
| 2011/0099048 A1 | 4/2011 | Weiss et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215903 A1 | 9/2011 | Yang et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0264663 A1 | 10/2011 | Verkasalo |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0047147 A1 | 2/2012 | Redstone et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |

(56) References Cited

U.S. PATENT DOCUMENTS

| | | |
|---|---|---|
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0158472 A1 | 6/2012 | Singh et al. |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0191512 A1* | 7/2012 | Wuoti .................. H04W 4/029 705/14.1 |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0246004 A1 | 9/2012 | Book |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0264446 A1 | 10/2012 | Xie et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0041866 A1 | 2/2013 | Simske et al. |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0185324 A1 | 7/2013 | Bouchard et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0225202 A1 | 8/2013 | Shim et al. |
| 2013/0226857 A1 | 8/2013 | Shim et al. |
| 2013/0227476 A1 | 8/2013 | Frey |
| 2013/0232194 A1 | 9/2013 | Knapp et al. |
| 2013/0254227 A1 | 9/2013 | Shim et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0304212 A1 | 10/2014 | Shim et al. |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |

(56) References Cited

U.S. PATENT DOCUMENTS

| | | |
|---|---|---|
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0048869 A1 | 2/2016 | Shim et al. |
| 2016/0078485 A1 | 3/2016 | Shim et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0157062 A1 | 6/2016 | Shim et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0287006 A1 | 10/2017 | Azmoodeh et al. |

FOREIGN PATENT DOCUMENTS

| | | |
|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

"Adding photos to your listing", eBay, URL: http://pages.ebay.com/help/sell/pictures.html, (accessed May 24, 2017), 4 pgs.

"U.S. Appl. No. 13/405,182, 312 Amendment filed Jan. 8, 2015", 13 pgs.

"U.S. Appl. No. 13/405,182, Advisory Action dated Apr. 10, 2014", 5 pgs.

"U.S. Appl. No. 13/405,182, Examiner Interview Summary dated Sep. 11, 2013", 3 pgs.

"U.S. Appl. No. 13/405,182, Final Office Action dated Dec. 19, 2013", 40 pgs.

"U.S. Appl. No. 13/405,182, Non Final Office Action dated Jun. 6, 2013", 32 pgs.

"U.S. Appl. No. 13/405,182, Notice of Allowance dated Nov. 24, 2014", 7 Pgs.

"U.S. Appl. No. 13/405,182, Preliminary Amendment filed Sep. 6, 2012", 3 pgs.

"U.S. Appl. No. 13/405,182, PTO Response to Rule 312 Communication dated Jan. 30, 2015", 2 pgs.

"U.S. Appl. No. 13/405,182, Response filed Mar. 19, 2014 to Final Office Action dated Dec. 19, 2013", 18 pgs.

"U.S. Appl. No. 13/405,182, Response filed Apr. 10, 2013 to Restriction Requirement dated Mar. 14, 2013", 11 pgs.

"U.S. Appl. No. 13/405,182, Response filed May 19, 2014 to Advisory Action dated Apr. 10, 2014", 30 Pgs.

"U.S. Appl. No. 13/405,182, Response filed Sep. 6, 2013 to Non Final Office Action dated Jun. 6, 2013", 17 pgs.

"U.S. Appl. No. 13/405,182, Restriction Requirement dated Mar. 14, 2013", 6 pgs.

"U.S. Appl. No. 13/405,182, Supplemental Amendment filed Dec. 12, 2013", 14 pgs.

"U.S. Appl. No. 13/892,201, Advisory Action dated Jul. 12, 2018", 3 pgs.

"U.S. Appl. No. 13/892,201, Advisory Action dated Aug. 15, 2017", 3 pgs.

"U.S. Appl. No. 13/892,201, Examiner Interview Summary dated May 16, 2018", 3 pgs.

"U.S. Appl. No. 13/892,201, Examiner Interview Summary dated Nov. 23, 2015", 3 pgs.

"U.S. Appl. No. 13/892,201, Examiner Interview Summary dated Dec. 1, 2016", 3 pgs.

"U.S. Appl. No. 13/892,201, Final Office Action dated Mar. 9, 2017", 19 pgs.

"U.S. Appl. No. 13/892,201, Final Office Action dated Apr. 19, 2018", 20 pgs.

"U.S. Appl. No. 13/892,201, Final Office Action dated Jul. 29, 2015", 19 pgs.

"U.S. Appl. No. 13/892,201, Non Final Office Action dated Mar. 16, 2015".

"U.S. Appl. No. 13/892,201, Non Final Office Action dated May 19, 2016", 21 pgs.

"U.S. Appl. No. 13/892,201, Non Final Office Action dated Sep. 29, 2017", 20 pgs.

"U.S. Appl. No. 13/892,201, Notice of Allowance dated Sep. 19, 2018", 8 pgs.

"U.S. Appl. No. 13/892,201, Response Filed Jun. 8, 2018Final Office Action dated Apr. 19, 2018", 12 pgs.

"U.S. Appl. No. 13/892,201, Response filed Jun. 16, 2015 to Non Final Office Action dated Mar. 16, 2015", 12 pgs.

"U.S. Appl. No. 13/892,201, Response filed Jul. 10, 2017 to Final Office Action dated Mar. 9, 2017", 12 pgs.

"U.S. Appl. No. 13/892,201, Response filed Nov. 18, 2016 to Non Final Office Action dated May 19, 2016", 10 pgs.

"U.S. Appl. No. 13/892,201, Response filed Dec. 8, 2017 to Non Final Office Action dated Sep. 29, 2017", 12 pgs.

"U.S. Appl. No. 13/892,201, Response filed Dec. 29, 2015 to Final Office Action dated Jul. 29, 2015", 11 pgs.

"BlogStomp", StompSoftware, URL: http://stompsoftware.com/blogstomp, (accessed May 24, 2017), 12 pgs.

"Daily App: InstaPlace (iOS/Android): Give Pictures a Sense of Place", TechPP, URL: http://techpp.com/2013/02/15/instaplace-app-review, (2013), 13 pgs.

"InstaPlace Photo App Tell the Whole Story", URL: https://youtu.be/uF_gFkg1hBM, (Nov. 8, 2013), 113 pgs, 1:02 min.

"International Application Serial No. PCT/US2015/037251, International Search Report dated Sep. 29, 2015", 2 pgs.

Gregorich, et al., "Verification of AIRS boresight Accuracy Using Coastline Detection", IEEE Transactions on Geoscience and Remote Sensing, IEEE Transactions on Year: 2003, vol. 41, Issue: 2, DOI: 10.11 09/TGRS.2002.808311 Referenced in: IEEE Journals & Magazines, (2003), 1-5.

Janthong, Isaranu, "Instaplace ready on Android Google Play store", Android App Review Thailand, URL: http://www.android-free-app-review.com/2013/01/instaplace-android-google-play-store.html, (Jan. 23, 2013), 9 pgs.

Jurdak, Raja, "An Acoustic Identification Scheme for Location Systems", IEEE, (Jan. 17, 2005), 1-10.

Kun, Hsu-Yang, et al., "Using RFID Technology and SOA with 4D Escape Route", Wireless Communications, Networking and Mobile Computing, WiCOM '08. 4th International Conference on Year: 2008 DOI: 10.11 09/WiCom.2008.3030 Referenced in: IEEE Conference Publications, (2008), 1-4.

(56) References Cited

OTHER PUBLICATIONS

Tripathi, Rohit, "Watermark Images in PHP and Save File on Server", URL: http://code.rohitink.com/2012/12/28/watermark-images-in-php-and-save-file-on-server, (Dec. 28, 2012), 4 pgs.

Xia, Ning, et al., "GeoEcho: Inferring User Interests from Geotag Reports in Network Traffic", Web Intelligence (WI) and Intelligent Agent Technologies (IAT), IEEE/WIC/ACM International Joint Conferences, vol. 2 DOI: 10.1109/WI-IAT.2014.73 Referenced in: IEEE Conference Publications, (2014), 1-8.

U.S. Appl. No. 13/405,182 U.S. Pat. No. 8,972,357, filed Feb. 24, 2012, System and Method for Data Collection to Validate Location Data.

U.S. Appl. No. 13/892,201 U.S. Pat. No. 10,204,137, filed May 10, 2013, System and Method for Data Collection to Validate Location Data.

"Cup Magic Starbucks Holiday Red Cups come to life with AR app", Blast Radius, [Online] Retrieved from the internet: <URL: https://web.archive.org/web/20160711202454/http://www.blastradius.com/work/cup-magic>, (2016), 7 pgs.

"Introducing Snapchat Stories", [Online] Retrieved from the internet: <URL: https://web.archive.org/web/20131026084921/https://www.youtube.com/watch?v=88Cu3yN-LIM>, (Oct. 3, 2013), 92 pgs; 00:47 min.

"Macy's Believe-o-Magic", [Online] Retrieved from the internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the internet: <URL: https://techcrunch.com/2011/09/08/mobli-filters>, (Sep. 8, 2011), 10 pgs.

Macleod, Duncan, "Macys Believe-o-Magic App", [Online] Retrieved from the internet: <URL: http://theinspirationroom.com/daily/2011/macys-believe-o-magic-app>, (Nov. 14, 2011), 10 pgs.

Macleod, Duncan, "Starbucks Cup Magic Lets Merry", URL: http://theinspirationroom.com/daily/2011/starbucks-cup-magic, (Nov. 12, 2011), 8 pgs.

Notopoulos, Katie, "A Guide to the New Snapchat Filters and Big Fonts", [Online] Retrieved from the internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function and for Whatever Reason, Time, Temperature and Speed Overlays", TechCrunch, [Online] Retrieved form the internet: <URL: https://techcrunch.com/2013/12/20/snapchat-adds-filters-new-font-and-for-some-reason-time-temperature-and-speed-overlays/>, (Dec. 20, 2013), 12 pgs.

\* cited by examiner

SYSTEM AND METHOD FOR DATA COLLECTION TO VALIDATE LOCATION DATA

CROSS-REFERENCE TO RELATED APPLICATION

This application is a continuation of U.S. patent application Ser. No. 13/892,201, filed on May 10, 2013, now issued as U.S. Pat. No. 10,204,137, which is a divisional of U.S. application Ser. No. 13/405,182, filed on Feb. 24, 2012, now issued as U.S. Pat. No. 8,972,357, and entitled "SYSTEM AND METHOD FOR DATA COLLECTION TO VALIDATE LOCATION DATA" and is related to U.S. application Ser. No. 13/405,190 filed Feb. 24, 2012, now issued as U.S. Pat. No. 8,768,876, and entitled "INFERENCE PIPELINE SYSTEM AND METHOD" each of the above-referenced applications being incorporated herein by reference in their entirety.

BACKGROUND

There are a variety of existing technologies which track and monitor location data. One example is a Global Positioning Satellite (GPS) system which captures location information at regular intervals from earth-orbiting satellites. Another example is radio frequency identification (RFID) systems which identify and track the location of assets and inventory by affixing a small microchip or tag to an object or person being tracked.

Additional technologies exist which use geographical positioning to provide information or entertainment services based on a user's location. In one example, an individual uses a mobile device to identify the nearest ATM or restaurant based on his or her current location. Another example is the delivery of targeted advertising or promotions to individuals whom are near a particular eating or retail establishment.

The need exists for systems and methods for collecting data that validates location data based on a variety of information sources, as well as provide additional benefits. Overall, the examples herein of some prior or related systems and their associated limitations are intended to be illustrative and not exclusive. Other limitations of existing or prior systems will be become apparent to those skilled in the art upon reading the following Detailed Description.

BRIEF DESCRIPTION OF THE DRAWINGS

The details of one or more implementations are set forth in the accompanying drawings and the description below. Further features of the invention, its nature and various advantages, will be apparent from the following detailed description and drawings, and from the claims.

Examples of a system and method for a data collection system are illustrated in the figures. The examples and figures are illustrative rather than limiting.

FIG. 17 depicts an example user interface whereby a user may configure a profile and service(s) to register a sign-in.

DETAILED DESCRIPTION

Figure 1:
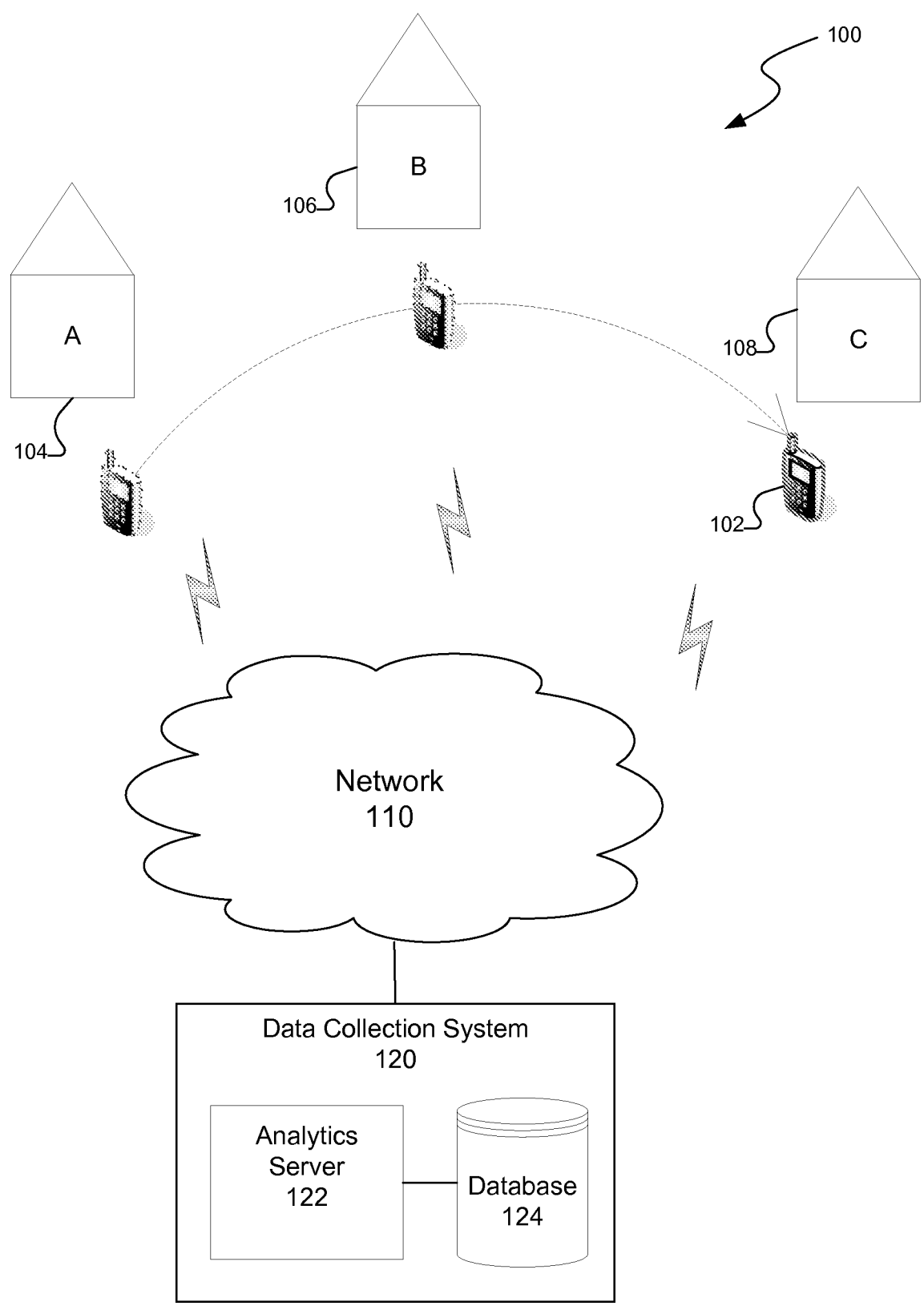
FIG. 1 depicts an example environment in which one implementation of the data collection system can operate.

In existing systems, both user data and place data are noisy. User location data can be noisy due to poor GPS reception, poor Wi-Fi reception, or weak cell phone signals. Similarly, mobile electronic devices can lack certain types of sensors or have low quality sensor readings. In the same way, the absence of a comprehensive database of places with large coverage and accurate location information causes place data to also be noisy.

A system and method for collecting and validating location data from a mobile device are described herein that overcome at least the above limitations and provide additional benefits. The data collection system gathers data and measurements from a user's mobile device. Using various sources, the data collection system can directly and indirectly validate location data. One way location data can be validated is by directly querying the user of the mobile device. For example, a survey question may appear on the user's device which prompts him or her to confirm a location. Another way location data can be validated is through indirect sources such as third-party websites, sensor measurements, and user activity.

The data collection system can gather relevant data via bulk import from third-parties. The data collected includes profile data, such as user account information, demographics, user preferences, etc. and observation data, such as location, sensor, device information, and activity streams, reference data, answers to survey questions, etc. The data collection system supports a feedback mechanism that pushes data to devices and is used for tuning the data collection strategy.

In some cases, the data collection system is part of a larger platform for determining a user's location. For example, the data collection system can be coupled to an inference pipeline which further processes location information. Additional details of the inference pipeline can be found in the assignee's concurrently filed U.S. patent application Ser. No. 13/405,190.

The data collection system can include an analytics agent. In one implementation, this analytics agent includes an application programming interface (API) that can easily be integrated with any device and referenced by a third-party. The API facilitates the data collection by abstracting the underlying implementation details of data collection specific to a device. An example of this API is referred to sometimes herein as a Placed™ Agent. An analytics agent can collect device data including location and sensor data from a device and make this data available for an inference pipeline. This data may be high volume de-normalized Observation Data (described below) that may be stored in any data storage.

The analytics agent can also collect user and device information that can be used to identify the source of each data observation. This profile data may be stored in any data storage. The analytics agent also exposes public interfaces which in turn become reference data. This data may be used for the training and validation of models in an inference pipeline.

The analytics agent is can be easily integrated with any device. This allows exponential growth of data collection as the analytics agent is integrated with devices by third-parties. These third-parties include software developers on mobile devices, web application developers, device manufacturers, service providers including mobile carriers, in addition to any company or organization that incorporates location into their offering.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

FIG. 1 and the following discussion provide a brief, general description of a representative environment 100 in which a data collection system 120 can operate. A user device 102 is shown which moves from one location to another. As an example, user device 102 moves from a location A 104 to location B 106 to location C 108. The user device 102 may be any suitable device for sending and receiving communications and may represent various electronic systems, such as personal computers, laptop computers, tablet computers, mobile phones, mobile gaming devices, or the like. Those skilled in the relevant art will appreciate that aspects of the invention can be practiced with other communications, data processing, or computer system configurations, including: Internet appliances, hand-held devices [including personal digital assistants (PDAs)], wearable computers, all manner of cellular or mobile phones [including Voice over IP (VoIP) phones], dumb terminals, media players, gaming devices, multiprocessor systems, microprocessor-based or programmable consumer electronics, and the like.

As the user device 102 changes locations, the data collection system 120 collects and validates information through a communication network 110. Network 110 is capable of providing wireless communications using any suitable short-range or long-range communications protocol (e.g., a wireless communications infrastructure including communications towers and telecommunications servers). In other implementations, network 110 may support Wi-Fi (e.g., 802.11 protocol), Bluetooth, high-frequency systems (3.g., 900 MHz, 2.4 GHz, and 5.6 GHz communication systems), infrared, or other relatively localized wireless communication protocol, or any combination thereof. As such, any suitable circuitry, device, and/or system operative to create a communications network may be used to create network 110. In some implementations, network 110 supports protocols used by wireless and cellular phones. Such protocols may include, for example, 2G, 3G, 4G, and other cellular protocols. Network 110 also supports long range communication protocols (e.g., Wi-Fi) and protocols for placing and receiving calls using VoIP or LAN.

As will be described in additional detail herein, the data collection system 120 comprises of an analytics server 122 coupled to a database 124. Indeed, the terms "system," "platform," "server," "host," "infrastructure," and the like are generally used interchangeably herein, and may refer to any computing device or system or any data processor.

1. Introduction

Before describing the data collection and storage strategy of the data collection system, the characteristics of this data is first described.

Figure 2:
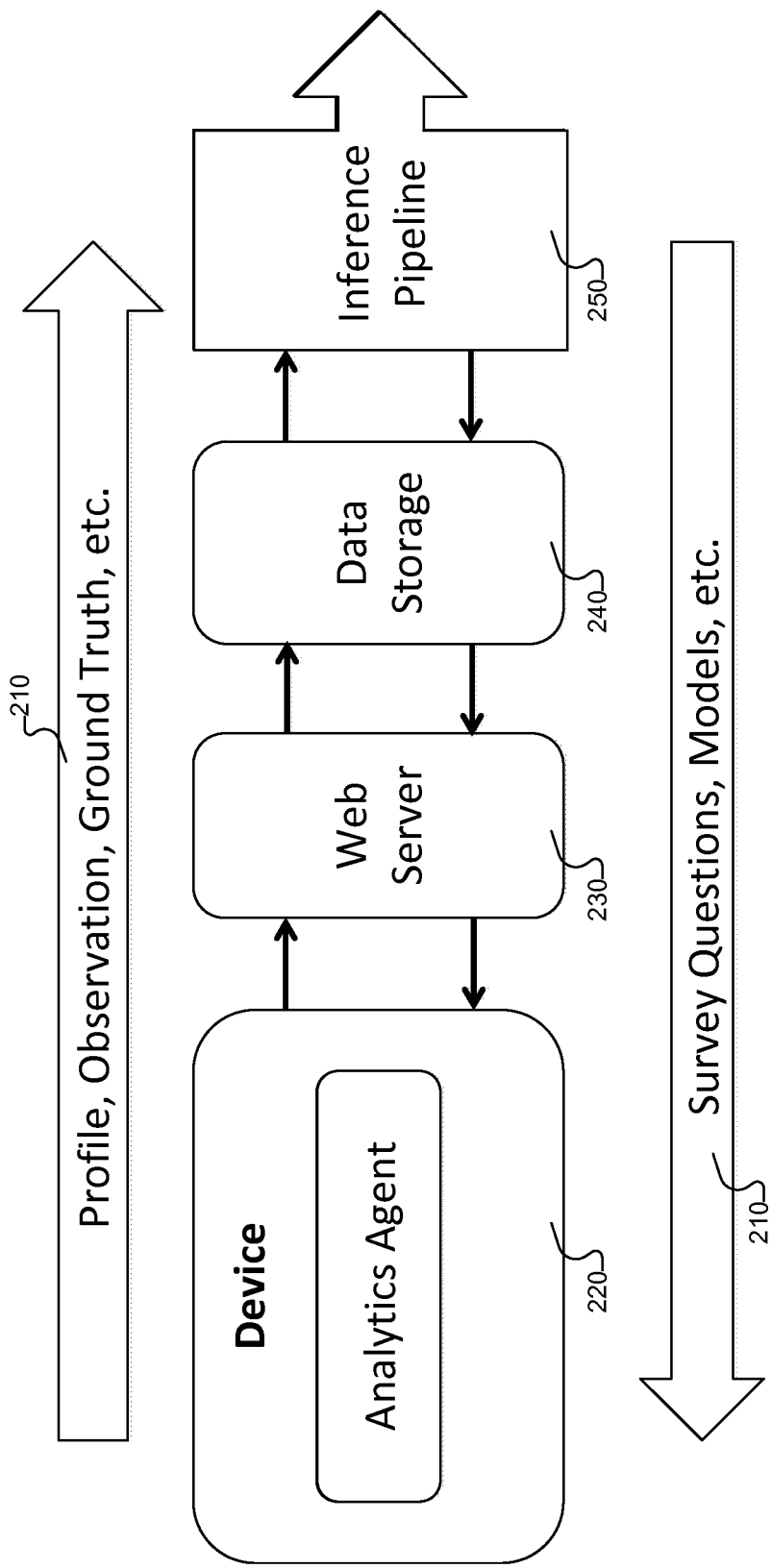
FIG. 2 depicts a high-level representation of data flow in the data collection system.

FIG. 2 illustrates a high-level representation of data flow 210 in the data collection system, as between a user device (including an analytics agent) 220, web server 230, data storage 240, and an inference pipeline 250. On a user device (e.g., 102), an analytics agent collects relevant data. The data may be stored anywhere and made available for an inference pipeline. There is a feedback loop that drives the data collection strategy based on models generated by the inference pipeline.

This feedback technique provides a means of collecting validation data for the models used in the inference pipeline.

2. The Data 2.1 Profile Data

This broadly includes data about the user and device.

2.1.1 User Data

This is data that provides details about the characteristics of the user. This includes, but is not limited, the user contact information, preferences, demographics, etc. This data can be combined with observation data to generate critical location based analytics.

Demographics include age, gender, income, education, relationship status, ethnicity, and a range of other characteristics that can be leveraged when analyzing observation data stream of the user.

2.1.2 Device Data

This is data that provides more details about the characteristics of the device. This includes the device identifiers, configuration, etc.

Since there could be multiple identifiers that can be associated with a device, all available identifiers are collected from the device.

2.2 Observations

Figure 3:
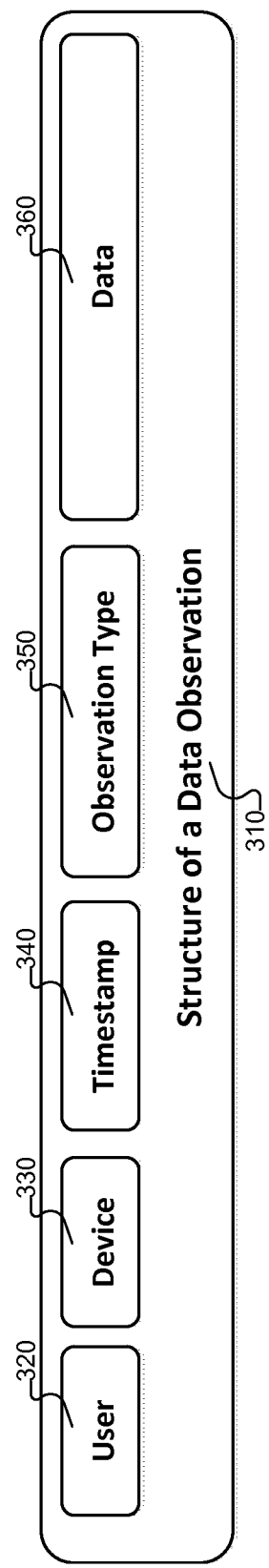
FIG. 3 depicts an example structure of observation data.

This broadly includes data that is collected from the device. The type of the observation could be a location, sensor, reference, etc. As shown in FIG. 3, the structure of observation data may be packed into data packets and transmitted to the analytics server.

FIG. 3 explains the components of an observation data packet 310 that links the data 360 collected from the device to a user 320 and device 330. It associates the data with the timestamp 340 when the data was observed and the type of data 350.

2.2.1 Location

This data is associated with the location of a device includes the latitude, longitude, altitude, accuracy of measurement, bearing, speed, etc. of the device.

Device provides location data from various sources including GPS, cell tower ID, Wi-Fi, Bluetooth, geolocation tagged images, temperature, light, sound, assisted GPS. Third-parties provide access to bulk feeds of location-related data.

2.2.2 Sensor

This data is associated with measurements from device sensors that include acceleration, magnetic orientation, proximity, light intensity, battery status, gyroscope, temperature, etc. The data collection system is also set up to collect sensor data that includes reading from the device accelerometer, compass, gyroscope, light detection, motion, etc. Data from one or more sensor readings can be used to determine the user activity or situation.

In one implementation, data from the accelerometer and gyroscope can indicate that a user is walking, running, biking, driving, etc., or that the user is inside versus outside based on natural daylight and dark or dim interior lights.

This data could be made available to an inference pipeline in a raw form of sensor measurements, or a derived form as hints to user behavior.

Advanced usage of these sensor readings include utilizing Bluetooth detection, temperature, weather, zip code, high-frequency audio/sound, WiFi points, altitude, proximity, etc. to derive a more accurate insight into the location of a user.

2.2.3 Reference Data

In order to validate the results generated by an inference model, reference data is collected. Reference data includes accurate observations that link a user with a place at an instance of time. This data is used to train and validate the inference models downstream for improved accuracy of prediction.

The following sections describe what is included in reference data.

2.2.4 Data Collected Directly from the User:

2.2.4.1 Place Queries

The data collection system collects location data from the device. In order to collect candidate places that correspond to this location data, the data collection system utilizes services that enable users to register a visit to a specific place and time.

A service includes a data source that provides contextual data associated with a location. This contextual data can include information about places nearby a location, along with characteristics of the places. Different services will have variations on what is considered to be in a user's vicinity.

To aid the user in the identification of the various candidate places in the vicinity, a service allows a user to search for places of interest in the user's vicinity. When the user conducts a search for places in his vicinity, the data collection system extracts the results of the search from a service and sends these place-query results along with the location where the query was made back to the data collection system.

Figure 4:
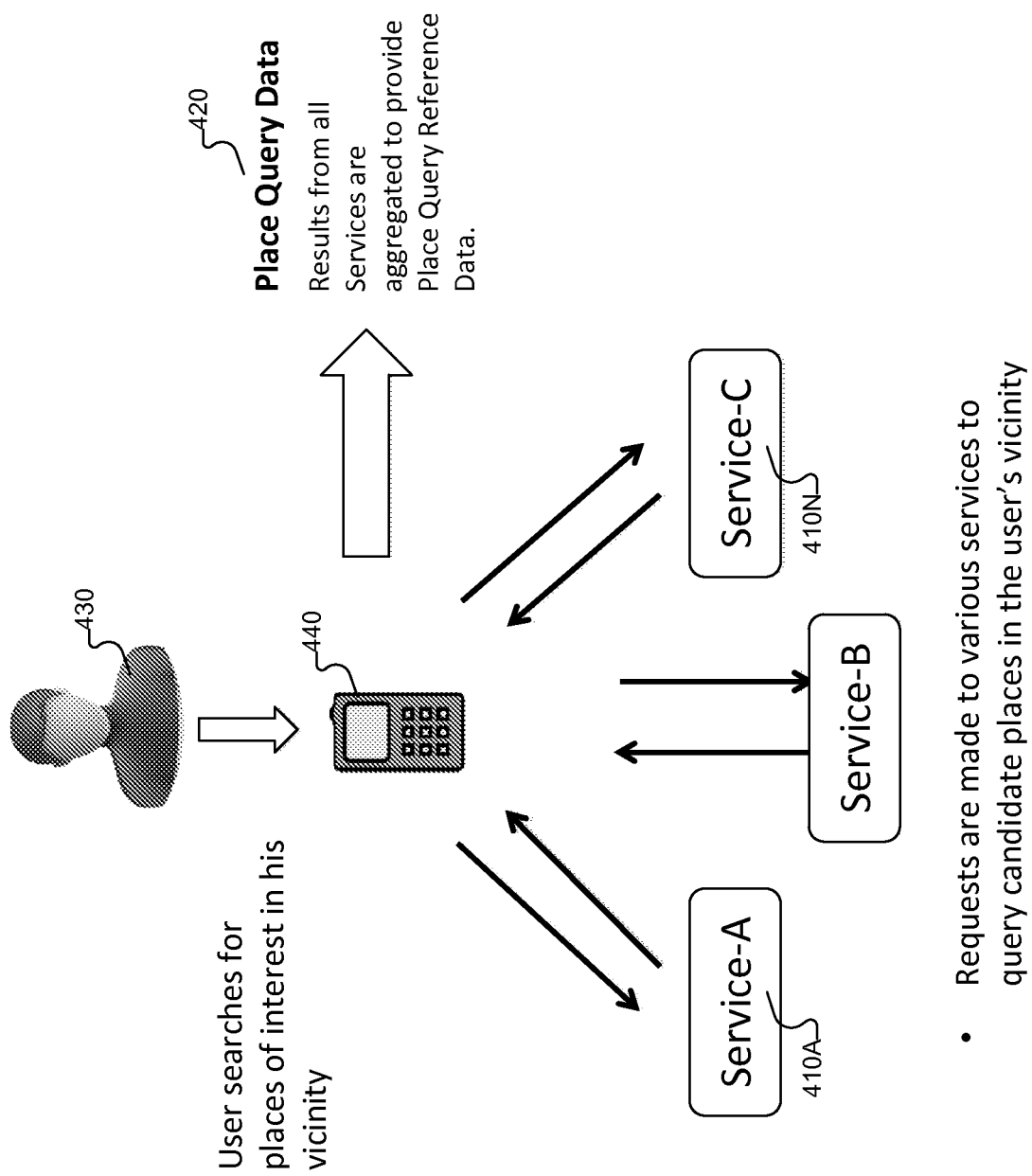
FIG. 4 depicts example user interactions with various services whereby place query data can be collected.

FIG. 4 illustrates example user interactions on with various services 410A-N whereby place query data 420 can be collected. As shown in FIG. 4, when a user 430 requests for nearby places an electronic device 440, multiple services retrieve candidate places in the user's vicinity.

Figure 5:
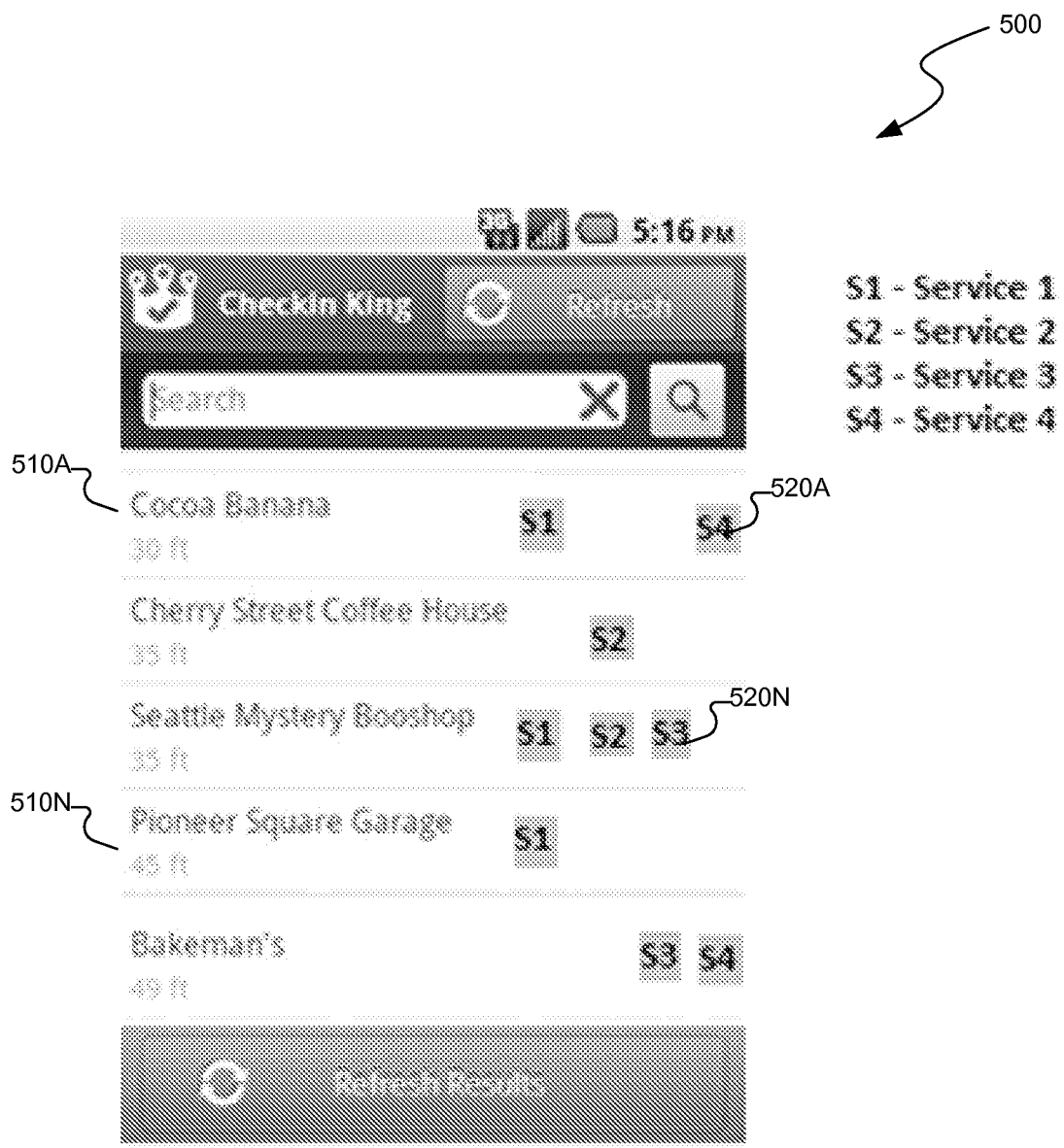
FIG. 5 depicts an example user interface that represents the search query results from various services.

FIG. 5 shows an example user interface 500 that represents the search query results 510A-N from various services 520A-N. These results are then aggregated and associated with the user's location, and can produce place query reference data for the inference pipeline.

2.2.4.2 Place Confirmation

After users request contextual data based on their location from services, they review the list of places, and confirm the actual place associated with their location. If a place is not listed, the user has the ability to manually add a place. The data collection system associates the confirmed place with the location data at and around the time of place confirmation. The data collected as part of a place confirmation can be made available as reference data for an inference pipeline.

Figure 6:
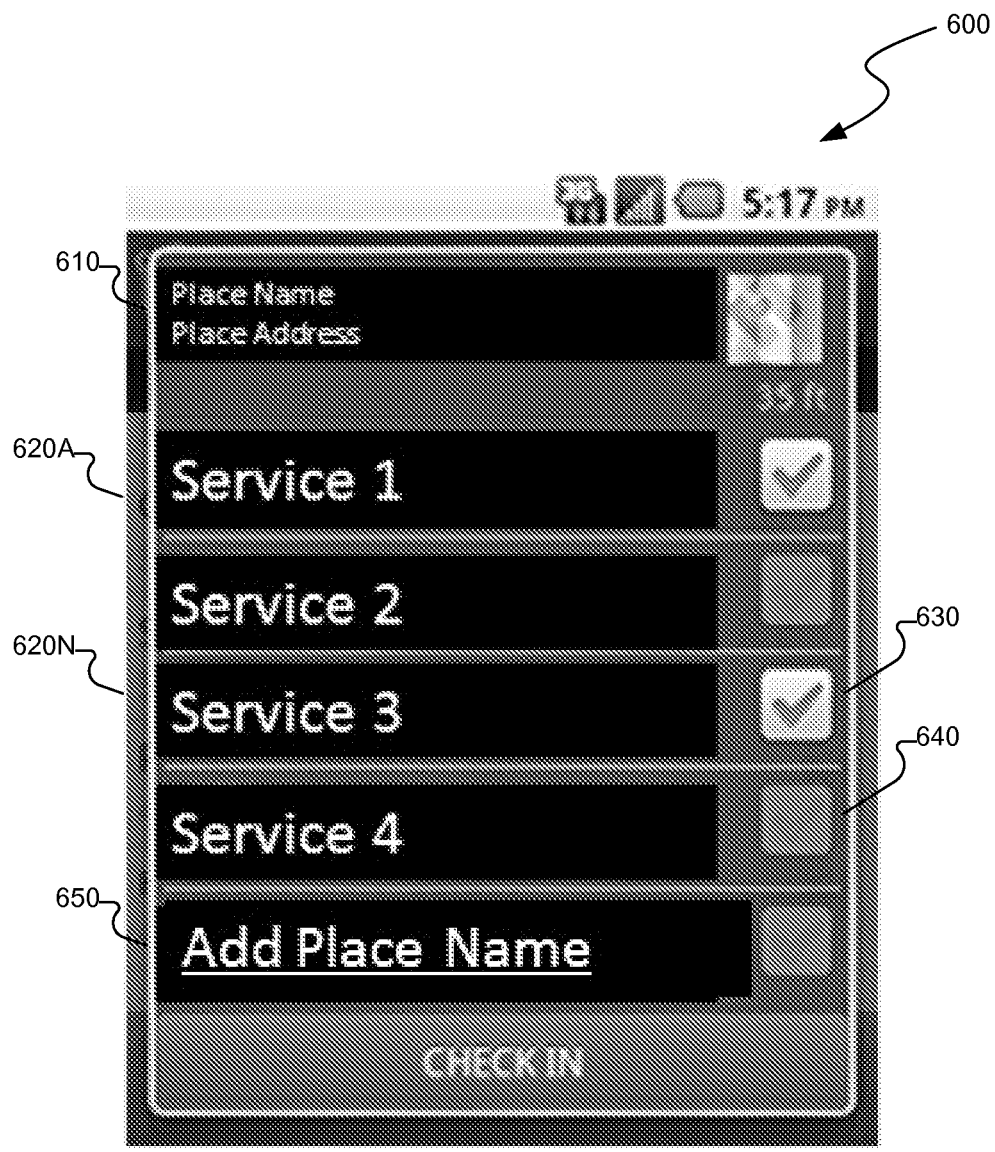
FIG. 6 depicts an example user interface.

FIG. 6 illustrates an example interface 600 that a user can use to check-in to a specific place. In this example interface, a user can choose the services (620A-N) that will register the user's check-in. Information 610 such as a place name, place address, and a corresponding location on a map is reflected on the interface. The user can select the specific service by toggling an indicator (630 and 640).

Place confirmation is not limited to manual confirmation. Measurements from sensors on the device, like sound, proximity, near field communication (NFC) chipsets can be utilized based on distinct characteristics for each place. As an example of a place confirmation can be obtained by utilizing the device to detect high frequency audio signals that encode the details of a place. A grocery store could be equipped with a device that generates audio signals that can be detected by sensors on a user's device. Place confirmations associated with these methods may be available to the inference pipeline as a form of reference data.

The data collection system facilitates easy means of allowing a user to confirm a visit to a place, and provides this data back to the server as reference data for the inference pipeline.

2.2.4.3 Offline Place Confirmation

Figure 7:
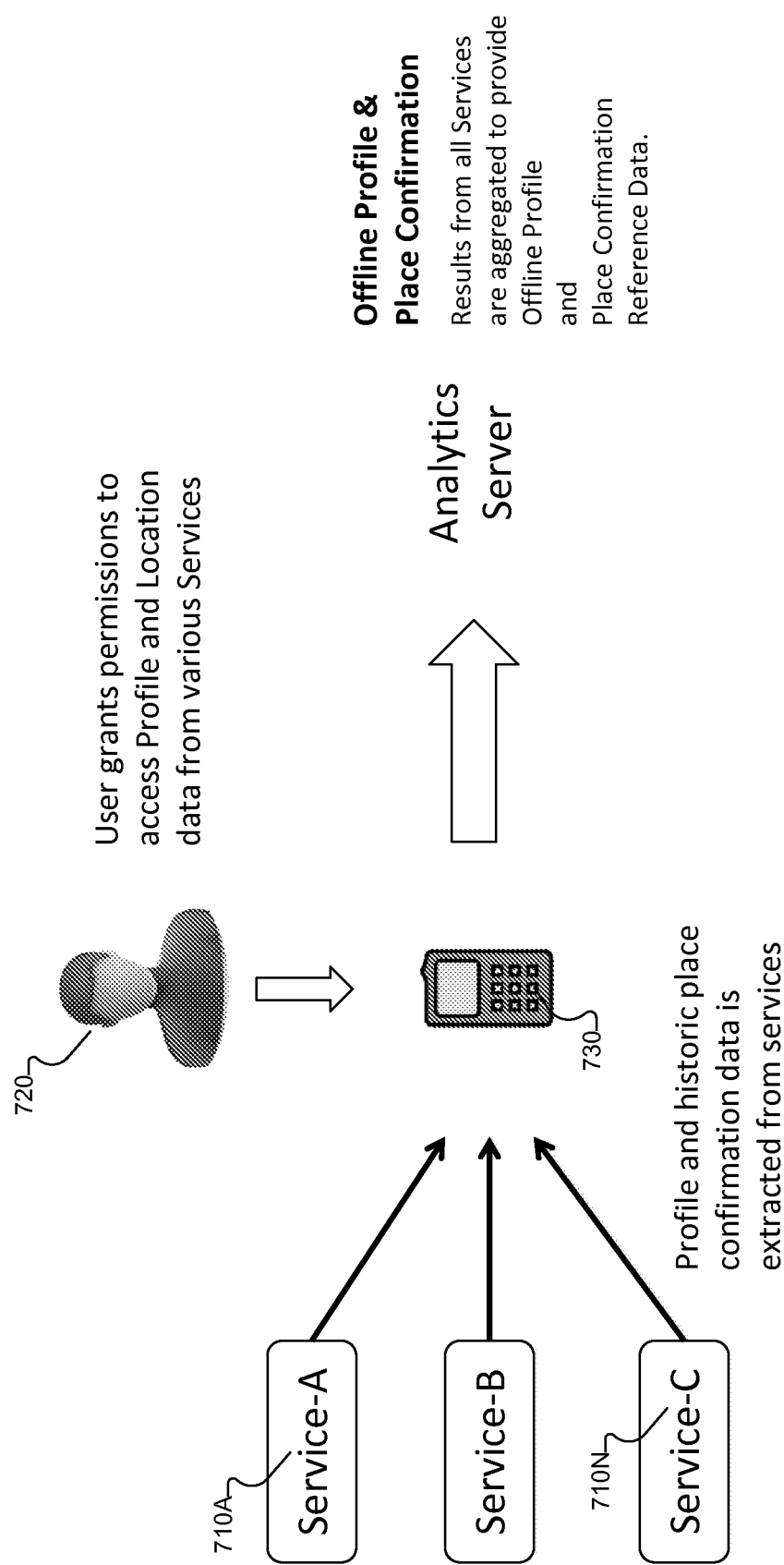
FIG. 7 depicts example user interactions with various services whereby offline profile and place confirmations can be collected.

FIG. 7 illustrates example user interactions with various services 710A-N whereby offline profile and place confirmations can be collected. As illustrated in FIG. 7, offline place confirmations occur when the analytics agent 730 is actively collecting data on a user 720, but does not directly receive a place confirmation. Offline place confirmations occur on another platform where a place confirmation has occurred. In other words, when the data collection system accesses place information provided by another service 710, the data collection system is accessing the place conformation offline because it is granted access to user data not available within the analytics agent.

User data made available from services include user profile data, activities, demographics, behavioral markers, and Place Confirmations. Offline place confirmations are transferred to the data collection system via the analytics agent and married with the data collected in the analytics agent to generate reference data that is used in the inference pipeline.

2.2.4.4 Place Survey Answers

Figure 8:
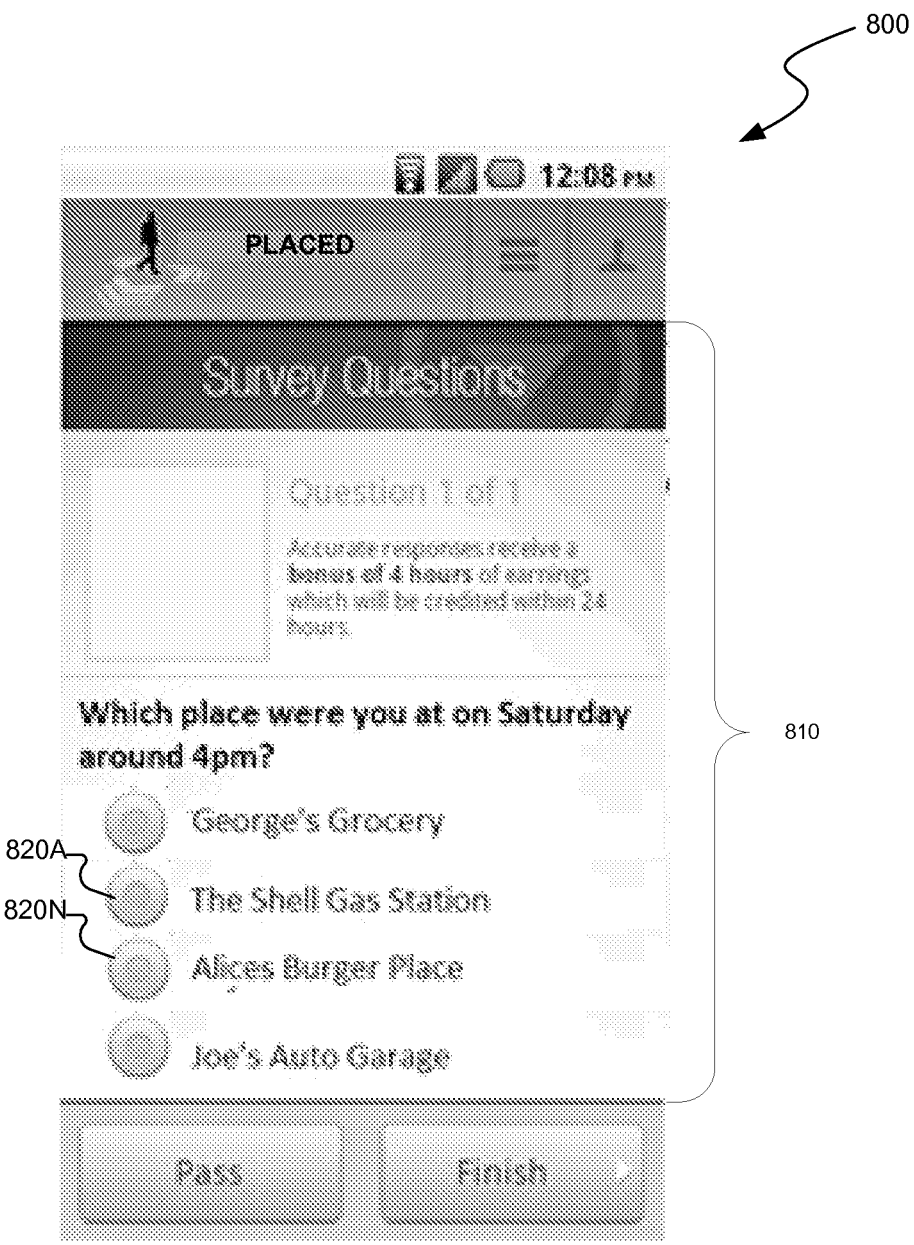
FIG. 8 depicts an example user interface displaying a place survey.

Place surveys are used to validate that a user is currently visiting, or has visited a place at a specific block of time. A place survey enables users to validate a location via a survey. Place surveys can take many formats including multiple choice, single affirmation, and open field response. FIG. 8 illustrates an example user interface 800 displaying a place survey 810. Place surveys can include known incorrect places 820A-N as options to identify users that provide false or bad data.

Place surveys are delivered digitally, typically via the device utilizing the analytics agent, with responses sent back digitally, typically via the device. Registered responses are treated as a form of reference data and utilized by an inference pipeline.

Figure 9:
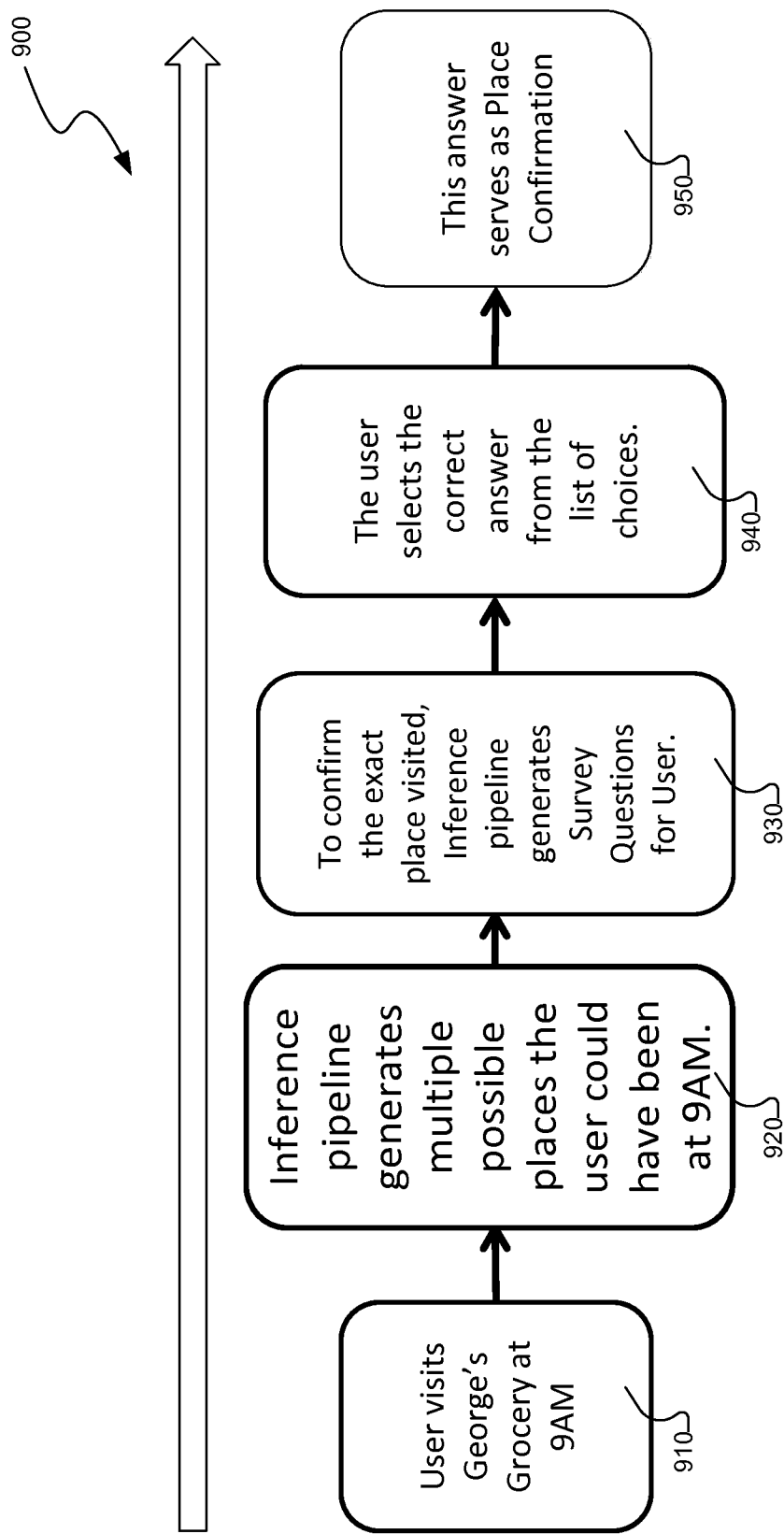
FIG. 9 depicts an example process by which places are generated in a place survey.

The data collection platform regularly prompts for survey questions based on various criteria which includes:
- Restriction by time of day: Ensuring that a user is not prompted when asleep
- Frequency cap: Ensuring a user is not overwhelmed by a large number of surveys
- Targeted users: Selection of users that could be incentivized to provide more accurate data FIG. 9 shows an example process 900 by which places are generated in a place survey. As illustrated in FIG. 9, a user visits a place called George's Grocery at 9 AM at block 910. At block 920, the inference pipeline generates multiple possible places the user could have been at 9 AM. Subsequently, the inference pipeline generates survey questions for the user at block 930. The user then, at block 940, selects the correct answer from the list of choices and this answer serves as a place confirmation at block 950. Place confirmations act as a reference data source used in the inference pipeline. The places not selected also provide data used in the inference pipeline in that it if a known incorrect answer is selected, the inference pipeline discounts all responses, and the inference pipeline is able to tune itself by understanding which nearby places the user did not visit.

2.2.4.5 Census Reference Data

By combining a digital log with a mobile device, a user can be associated with a verified location in order to produce validated place data. The device registers observations that include location data, and the digital log enables an individual to log actual place and time data. Using time stamps, the place and time data of the digital log are combined with device observation data as a "join point." A join point can use time to correlate digital log data with device observation data. This joining of two sources of data generates reference data for the inference pipeline. For example, when a user enters information into a digital log that he was at a coffee shop at 9 AM and when there is observation data collected at 9 AM, a join point is created for 9 AM that associates the device observations with a location of the user (i.e., coffee shop).

Reference data is considered highly accurate and generates quality-based entries for the digital log and is designed to generate pinpoint accuracy in terms of location, place, time, and activity.

TABLE 1

| Place Nate | Mall/ Area | Date | Walk-In-Time | Leave Time | Entry/ Exit | Path to Place | Actions at Place | Notes/ Issues |
|---|---|---|---|---|---|---|---|---|
| General Store | Main St | Nov. 8, 2011 | 11:52 am | 12:01 pm | South Door | Took sidewalk from parking lot | Stood near entrance | NA |

Table 1 provides example fields in the digital log completed by a census. The values in these fields assign information to device observation data. The level of precision and accuracy is considered high based on the details collected by the digital logs. This census level data is considered high value across reference data sources.

2.3 Indirect Data Sources

Indirect data sources are acquired outside of the analytics agent. These indirect data sources provide markers including place, time, and location. These indirect data sources are acquired through various methods including imported data, crawled web content, third-party APIs, travel logs, photos, purchase data, calendars, call logs, geo-tagged content, and social networks. Social network activity and content data includes sharing of location information through status updates, geo-tagged content, including pictures and video, displayed or scheduled events, set preferences and associations, content interaction, profile information, and social network connections.

2.3.1 Third-Party Sites 2.3.1.1 Geotagged Content

Any content with markers explicit or implicit qualifies as geotagged content. Explicit content is content that is tagged with a specific location in the form of address, latitude and longitude, or any other identifier of location. Implicit content is deriving signals from non-location specific data to infer a location.

Explicit content includes geo-tagged photos, events tracked digitally, social network activity, directions from one place to another, purchase data, rewards programs, membership cards, and online reservations. All explicit content has a location identifier that acts as a form of reference data to infer that user has visited a location. Examples of explicit content include a restaurant reservation made online which would include explicit location data with the address of the restaurant, and time of reservation.

Implicit content includes blog posts, social network activity, measurable activity across personal and professional connections, web content, and call logs. This type of content does not have a specific location, but can be inferred through data mining techniques. As an example, a person who visits a restaurant website, and then calls the restaurant, has a higher probably to be placed at restaurant than if this content was not available. As another example, when a user places an online food order for delivery or takeout, this information may also serve as implicit content through which location can be inferred.

2.3.1.2 Device Content and Activity:

Media and activity on the device can provide relevant information related to the location of a user. This may include calendar appointments, geo-tagged photos, phone calls and voicemails, reminders, texts, emails, email tags, internet search activity, etc.

The data collection system may extract address, place and time information from calendar appointments and associate it with measured location data from the analytics agent. Another example of device content is extracting time, latitude, and longitude from a geo-tagged photo and then using image recognition technology to identify or estimate a place to associated with device data.

Most modern devices equipped with a camera support the ability to associate the picture taken with the camera with metadata including date, time, and the location information (latitude, longitude, etc.) and the time at which the picture was taken.

In addition to the latitude and longitude, additional data can be garnered from the image, including accessing tags associated with the image. As an example, a photo on a social network might include tags that describe features of the place the image was taken (e.g., "Space Needle", "Visiting Seattle's Space Needle", "With Jill at the Space Needle"). Using image recognition technology, the place in the picture can be determined. This processing can occur on the device or by using a service to process the image and return a resulting place.

Using call logs, and voice and sound recognition, data can be converted to identify place information associated with the mobile device. Call logs can be mapped to a place, and tying in latitude and longitude act as a form of reference data. With voice and sound recognition, conversations can be mined for details on the current location, as well as past and future activities. An example conversation would be:

Receiver: This is Judy's Hair Salon.
Caller: This is Jill. I'd like to schedule a haircut with Sandy this Sunday at 7:30 pm.

Additionally by taking into account background sounds, it is possible to narrow down places a user may be. As an example, noise from a subway station including the sound of trains on rails, schedule announcements, and crowd noise can act as signals to identify a place.

Digital calendars typically include metadata that indicates time, date, location, and people to be at a certain location at a certain time. This information can be utilized to validate and expand reference data sets.

Using text searches, the inference pipeline can identify place and time associations on the mobile device. For example, if the user has an email that mentions his itinerary for a vacation, it is most likely going to have place and time information for the period of the vacation. This information identifies or estimates the place of the user and can be associated with device data at that time.

Device activity, such as battery status, can provide indicators of location. For example, when a metric of battery life increases, this is indicative of a charging device whereby a user may be limited to select locations. This data is used in the inference pipeline to further refine the list of places a user maybe at a given point in time.

2.3.1.3 In-Store Activity

Users store activity sourced from credit card activity, coupon redemptions, credit reports, membership cards, and reward or loyalty programs are an additional source of data that provide insight to the places visited by a user at a given instance of time. Store activity incrementally provides details around a purchase including items, and price.

Store activity married with location data act as a form of automated place confirmation. The act of a purchase identifies a place where purchase occurred, and a time when the purchase occurred. These values joined with location data act as a form of place confirmation and is treated as reference data for an inference pipeline.

Without the location data, store activity is still used in an inference pipeline as identifying the user has visited place attributed by purchase, and the frequency of purchases determines frequency of visits. This store activity can serve as a behavioral roadmap of past activity and can be indicative of future behavior in the form of places visited.

This data could be collected in real time or offline via bulk imports and made available for the inference pipeline.

2.3.1.4 Network Data

Network data includes a network of devices that registers location data at various levels of precision. Sources of network data include mobile carriers, network service providers, device service providers and the data and metadata may be collected as a byproduct of core services.

As an example a mobile carrier provides cell phone service to millions of customers via their cellular network. This network as a byproduct of providing core cell service registers location data because the mobile device is connected to an access point. Aggregating this data across all customers creates a density map of carrier activity associated with location, which the data collection system defines at Network Data. This network data can act as a proxy of baseline location activity for millions of customers. In addition, the network data may help to identify popular sites or more trafficked areas so that more accurate predictions for a user's location can be made.

The network data acting as baseline location activity enables the data collection system to identify location biases and build models to normalize against those biases. As more sources of network data are incorporated, the models become more robust and diversified as a single source may not accurately represent a population in a given geographic area.

3. The Client

In order to collect data in a consistent manner from devices, the data collection system includes an analytics agent that is architected to collect location relevant data from a device and store this data anywhere making it available for the inference pipeline.

3.1 The Analytics Agent

The analytics agent provides a simple interface that easily integrates with user devices. It exposes simple public interfaces that can be used to collect profile and observation data. The analytics agent has device-specific means of collecting device data including location and sensor data from the device. The API is architected for easy set up and integration with devices.

Figure 10:
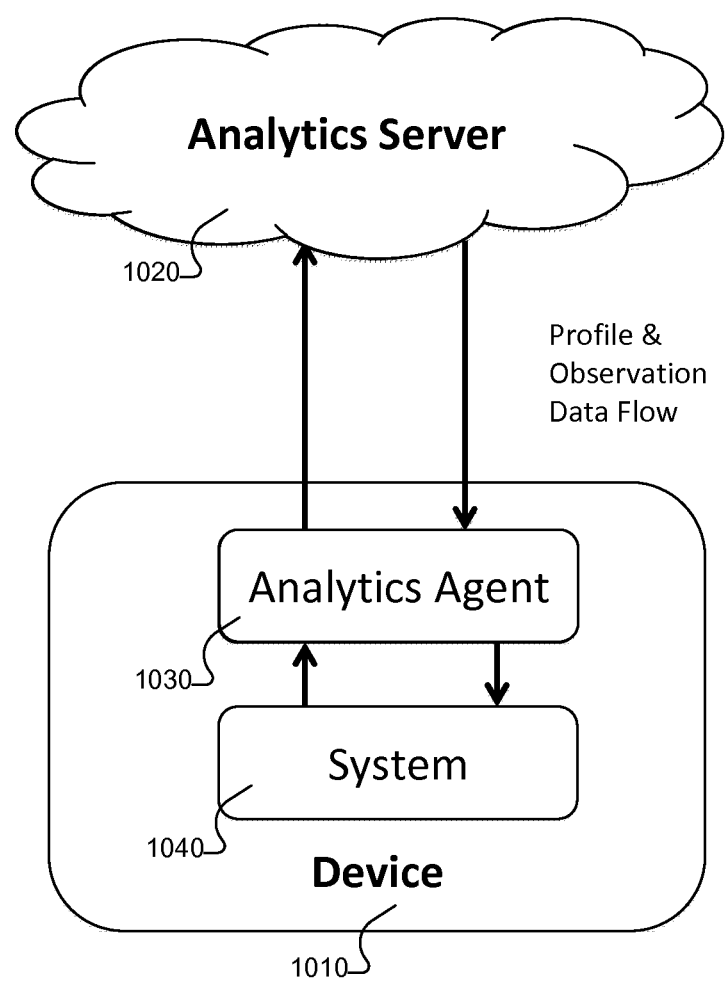
FIG. 10 depicts a high-level architecture of an analytics agent assisting data flow between a device system and a device storage.
Figure 11:
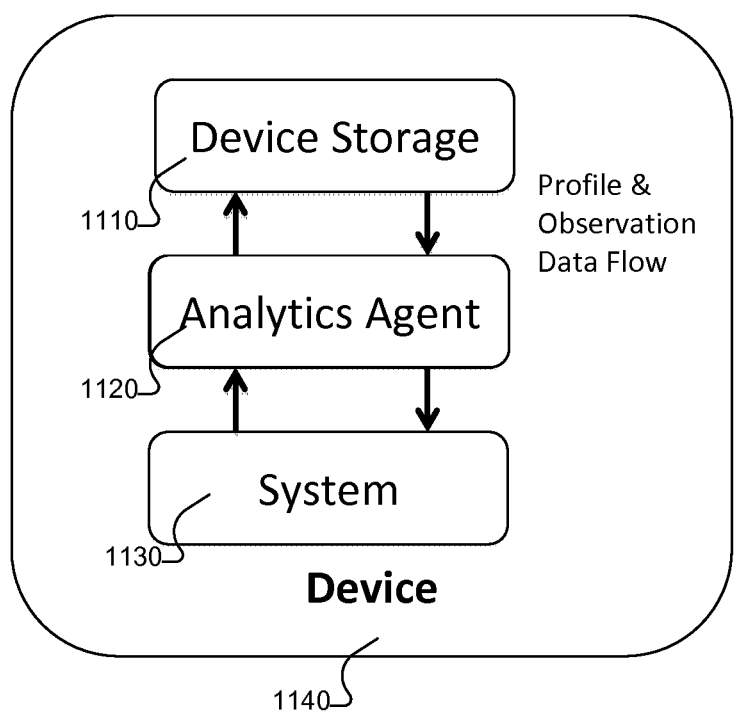
FIG. 11 depicts a high-level architecture of an analytics agent assisting data flow between a device and an analytics server.

FIG. 10 illustrates a high-level architecture of an analytics agent 1030 assisting data flow between a a device storage (not shown) on an analytics server 1020 and user system 1010 and analytics agent 1030 on a device 1010. FIG. 11 illustrates a high-level architecture of an analytics agent 1120 assisting data flow between a user system 1130 and a device storage 1110 on the device 1140. In FIGS. 10 and 11, the analytics agent receives/collects data from the device that may be stored on the device storage or may be transmitted back to the analytics server. The analytics agent also provides a feedback mechanism by which data collection in the device can be tuned.

3.1.1 Location/Sensor Data Collection

The analytics agent has a background activity that collects observation data at intervals of time that are determined by algorithms that are optimized to gather as many data points required for the inference pipeline with the least impact on the device resources. This data collection activity runs as a background thread on the device and does not block the normal functioning of the device.

3.1.2 Data Storage on the Device

The analytics agent may provide abstractions over the device data storage to store data on the device if necessary. The device data can be made available to the inference pipeline on the client. The device data may also be transmitted to the analytics server in raw form, batched, compressed, or by various other means of data transmission.

3.1.3 Data Transmission

The analytics agent may provide abstractions over the device data transmission protocols to send/receive data to the analytics servers.

Data transmission may be batched to improve efficiency of data transfer. To avoid single large data transmission, the maximum size of data may be capped per sync batch. The analytics agent may include transmission failure handling that mitigates data Sync failures due to various reasons such as the network is unavailable, client errors, server error, etc.

If the data transmission fails, the agent may choose to retry the transmission an acceptable number of times, after which the data may be deemed corrupt and marked for purge. Purging of data may be necessary to ensure efficient usage of the device storage.

3.2 Third-Parties

Figure 12:
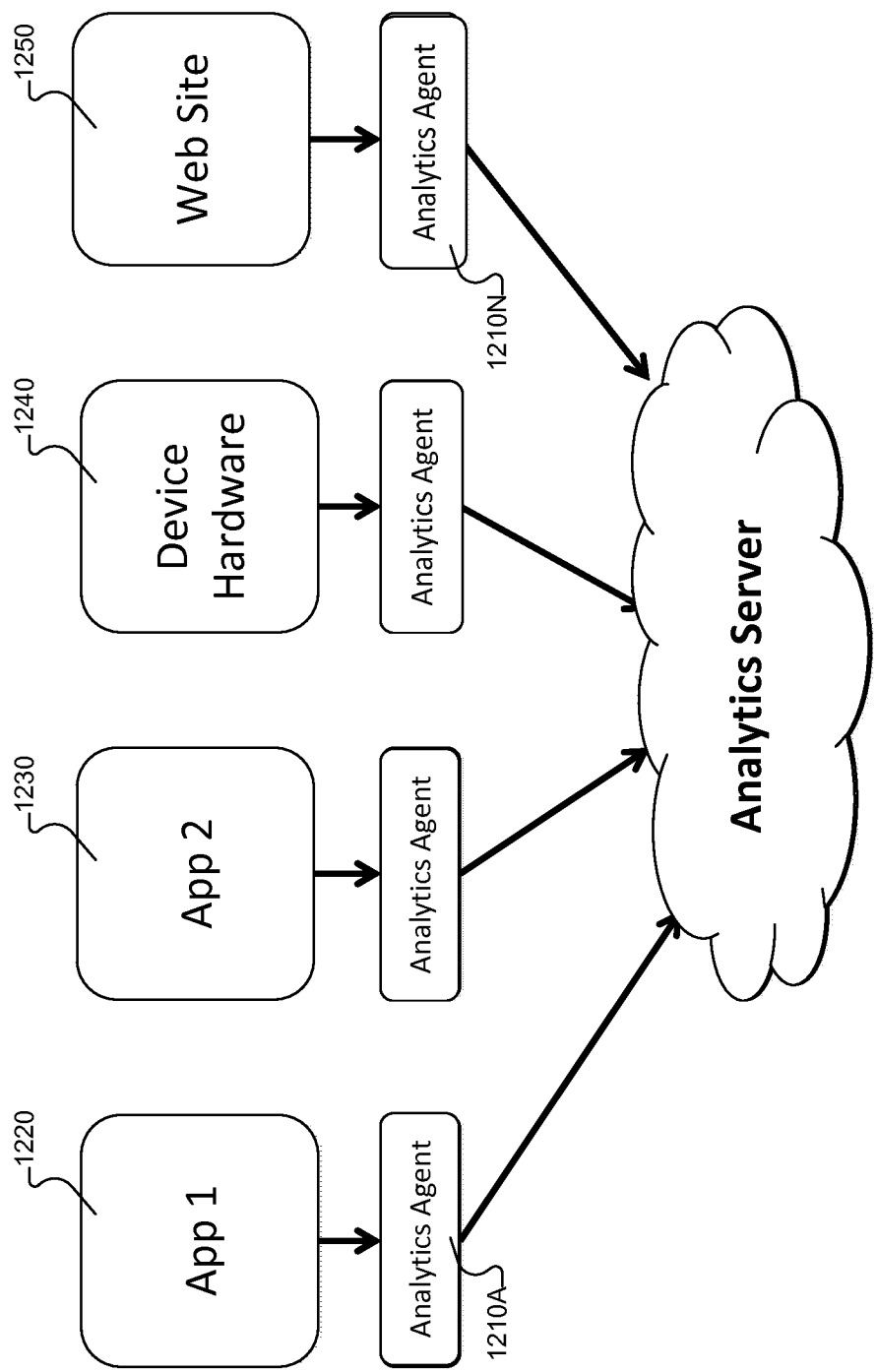
FIG. 12 depicts example systems and applications that can integrate the analytics agent of the data collection system.

FIG. 12 illustrates example systems and applications (e.g., 1220-1250) that can integrate the analytics agent (1210A-N) of the data collection system. As shown in FIG. 12, the independent and generalized mechanism of data collection in the analytics agent enables third-parties to easily integrate the analytics agent in their devices. The analytics agent provides the third-party an API library in exchange for location-based analytics from a device.

This approach enables the data collection system to exponentially scale the rate of data collection as more and more individuals utilize the analytics agent.

An example of this scenario could be a mobile application that allows customers to scan the barcode of consumer products in a shop to obtain more product information, and to even purchase the product. The developer of this application may choose to integrate the application with the analytics agent API to tag barcode scans with location and other sensor-related data. In turn, the data collection system can collect location-related data from third-party applications, thus exponentially scaling the rate of a data collection.

4. Data Collection Implementations

4.1 Standalone Client Implementation

One form of the data collection system has the inference pipeline running on the device. In this scenario the inference pipeline accesses this data directly on the device and runs the inference modeling on the device to generate the feedback that may be used by the data collection system. This process enables the entire cycle from data collection to inference modeling, as well as a feedback loop to be encapsulated on the device.

4.2 Client and Server Implementation

Client and server implementation is when the data collection system the analytics agent transmits data from the device to the analytics server. This allows for inference and data aggregation to be done on the server and feedback to be transmitted back to the device via the analytics server.

This also allows for hybrid approaches where inference and feedback occurs both on the client and server.

5. The Analytics Server

5.1 Representative Environment of the Analytics Server

The analytics server receives incoming data collected from the devices. The server may also push data to the devices creating a feedback loop that drives efficient data collection.

Figure 13:
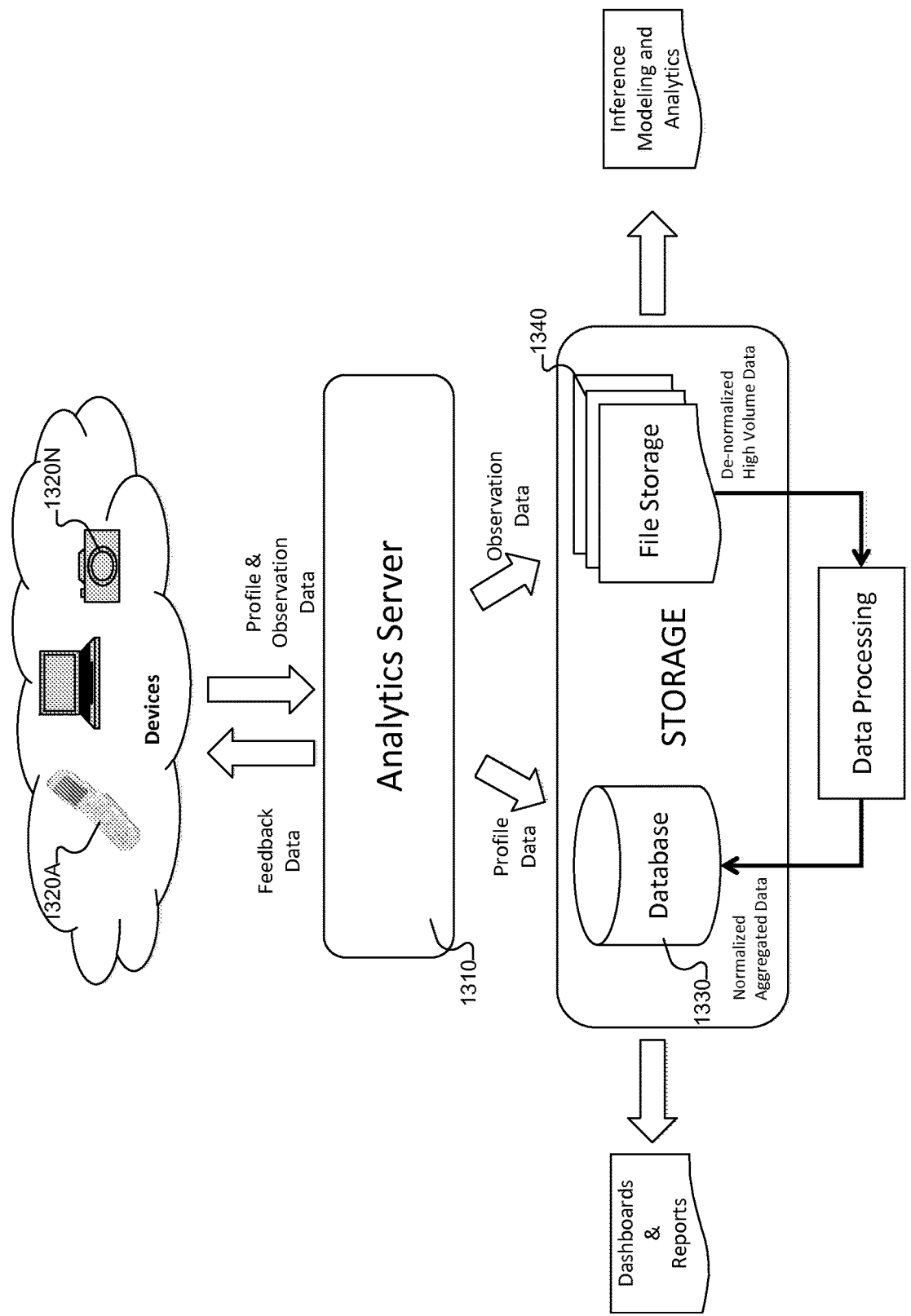
FIG. 13 depicts a high-level layout of backend components and data flow.

FIG. 13 shows a high-level layout of the backend components and data flow. Devices 1320A-N may transmit data that is received by the analytics server 1310. Profile data is stored in relational databases 1330 while the large volume Observation data is stored in distributed file storage 1340. Data processing jobs are used to normalize the large volume data in a distributed files storage, which is then merged with profile data and made available for reports and dashboards. The raw observations are made available for the inference pipeline.

5.1.1 Storage of Profile Data

Profile data typically scales linearly as the number of users and devices increases. This data is usually accessed frequently. Hence the server directs this data to be stored in relational databases.

5.1.2 Storage of Observation Data

Observation data grows exponentially as the number of users and devices increases. This data is typically processed by offline processing jobs that de-normalize the data for easier access. The server directs this data to be stored in distributed file storage.

5.2 Data Segmentation

The data collected from the devices are stored with the following segmentations

5.2.1 Segmentation of Data by Device and User

Observation data has a reference to the user and device that made the observation. This allows for efficient storage and retrieval of data.

Figure 14:
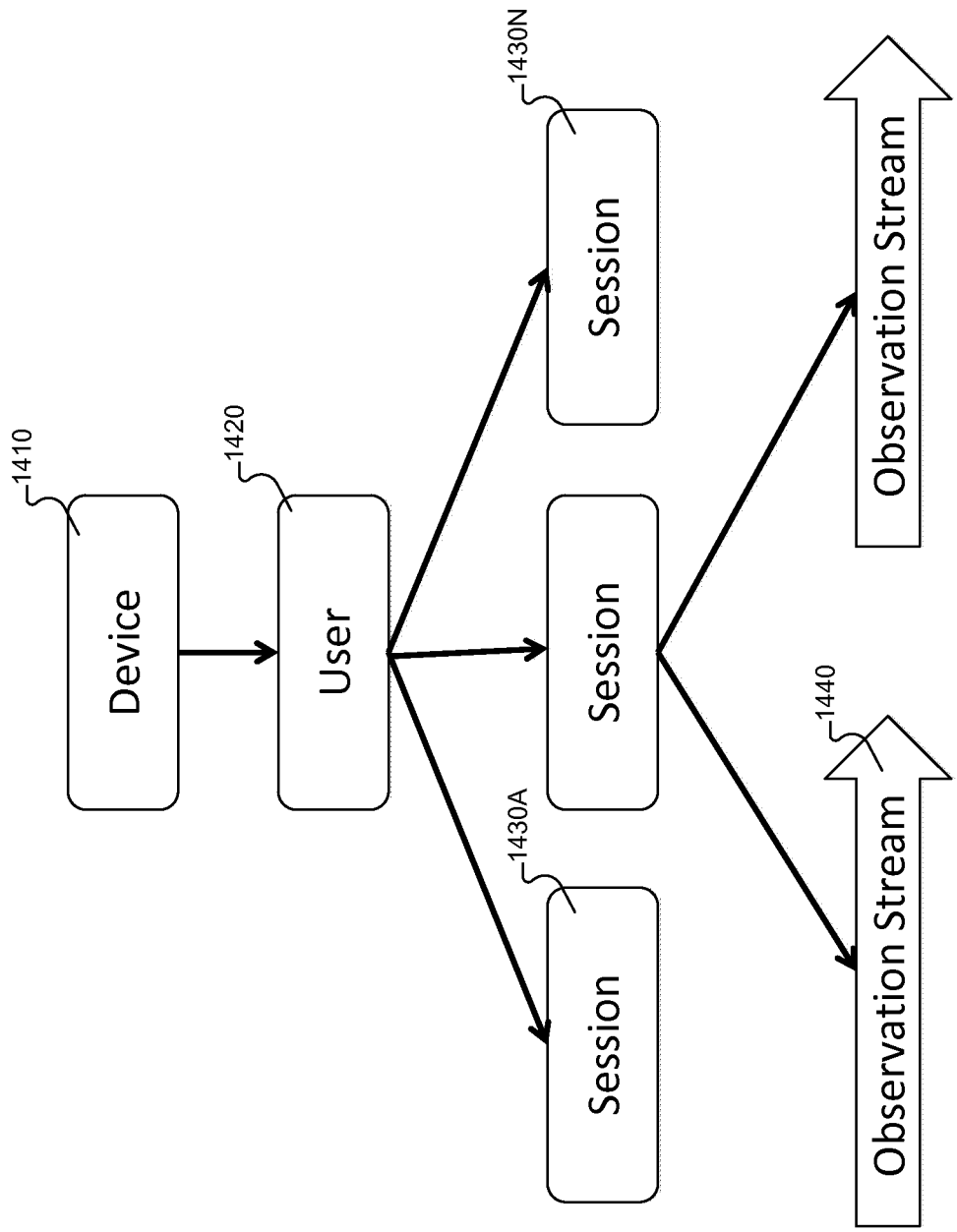
FIG. 14 depicts a high-level segmentation of observation data by device, user, and session.

FIG. 14 illustrates a high-level segmentation of observation data by device 1410, user 1420, and session(s) 1430A-N. As shown in FIG. 14, a user 1420 is associated with a device 1410. Each user, when active can create multiple user sessions 1430A-N. Each session represents a window of time the application was in use and in which observations 1440 are clustered. While the user is in a session, all observations that occur are associated with this session.

This provides the ability to track for example, multiple users using a single device. In another instance, a single user who has reinstalled the application multiple times can be tracked, wherein each installation signifies a new session.

5.2.2 Panels

A panel is an abstraction of a business grouping. Abstraction called panels are used to associate users with specific business groupings. Users may be invited to join panels based on the business goals of the panel. Inference and analytics may leverage this panel abstraction to correlate and/or aggregate results against a panel.

5.2.3 Panelists

A panelist represents the association of a user's association with a panel. Abstractions called panelists are used to identify a user who is associated with a specific panel. Users are invited to join a panel. They may choose to join the panel to become panelists. Location related data may be segmented by panelists.

5.2.4 Usage

Usage refers to the abstraction of the availability of observation data for a user. Usage is associated with the availability of observation data. This usage may be segmented by panelist thereby identifying the activity of a user in the context of a panel.

5.2.5 Usage Redemption

When a panelist utilizes a device that is enabled with the data collection system, they may accrue usage. This usage may be redeemed for rewards that may be distributed by the panel owner.

5.2.6 Custom Questions

Survey questions may be pushed to panelists within the context of a panel segmentation. Questions are segmented by panel and can be targeted to specific panelists if necessary.

5.3 Data Storage

5.3.1 Profile Data

The profile data received from devices are stored in a relational database. This data is used to drive the device, web dashboards and internal/external reports. This data is also used by the inference pipeline and provides the analytics when mapping observations to user, device and demographics, etc.

5.3.2 Observation Data

Figure 15:
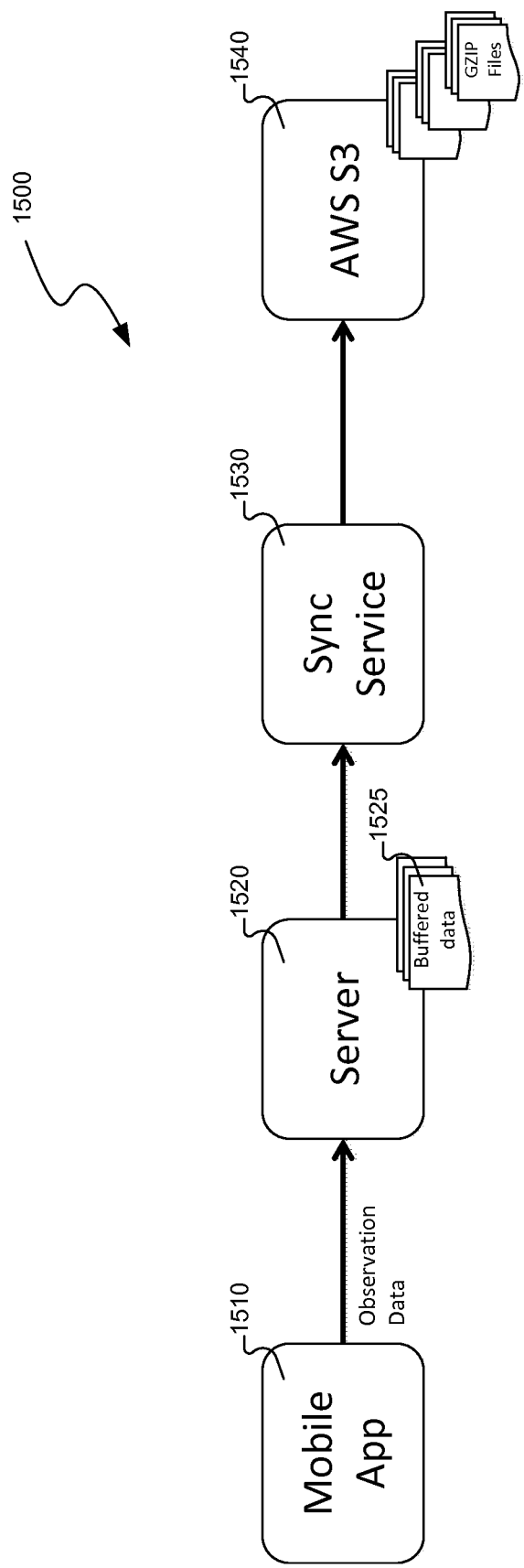
FIG. 15 depicts an example process by which the analytics server receives observation data from a device.

FIG. 15 illustrates an example process 1500 by which the analytics server 1520 receives observation data from a device 1510. It is buffered 1525 on each server node 1520 and periodically uploaded to the storage 1540 by a sync service 1530.

5.3.3 Normalization of Observation Data

In order to report and act upon the large volume of de-normalized observation data in storage, the observation data is normalized. The first stage is to sort and group observations by user, device and/or timestamp. The next stage is to iterate through the grouped data and compute aggregated metrics like session and location counts per user, activity per user on an hourly basis, etc. The normalized data is then stored in a relational database and available to the front end application and reports. In one implementation, reports include predicted place visits. Predicted place visits are a set of places that user may have visited at an instance of time. Each visited place is associated with a probability that the person was at that place.

5.3.4 Denormalized Observation Data

The denormalized observations collected from the device are made available for the inference pipeline to process for inference and analytics.

6. The Feedback Loop

Figure 16:
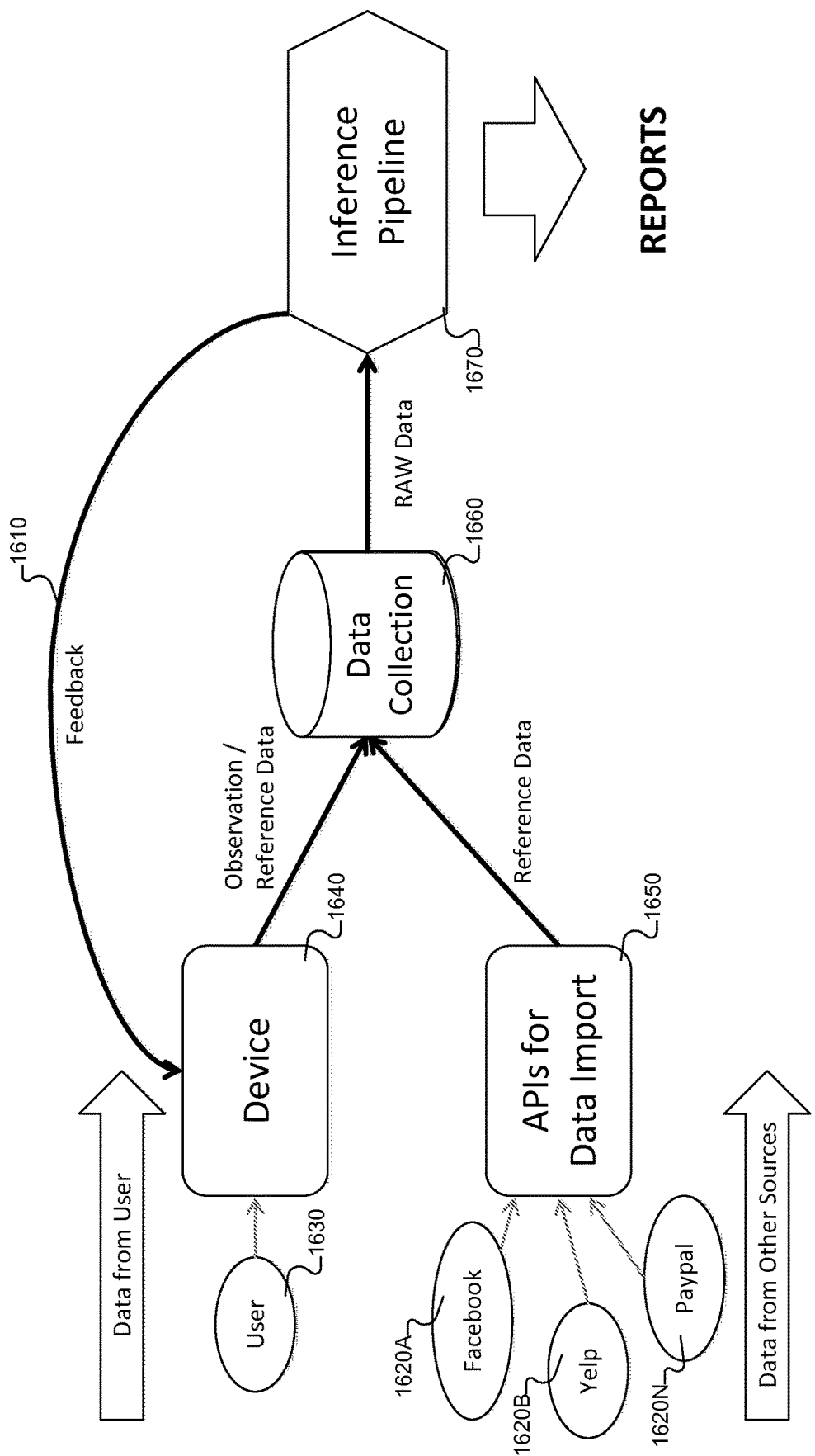
FIG. 16 depicts a suitable process and environment in which implementations of the data collection system can operate.

FIG. 16 illustrates a process and environment in which implementations of the data collection system can operate.

As shown in FIG. 16, a feedback loop 1610 in the data collection system which allows characteristics of observation data to tune the data collection strategy for higher accuracy and efficient usage of device resources. As discussed above, observation and reference data can originate from an electronic device 1640 of a user 1630 or from services 1620A-N via data import 1650. The data collection system 1660 receives and processes the observation and reference data and forwards the necessary information (e.g., raw data) to the inference pipeline 1670 for further analysis.

7. User Interface

Figure 17:
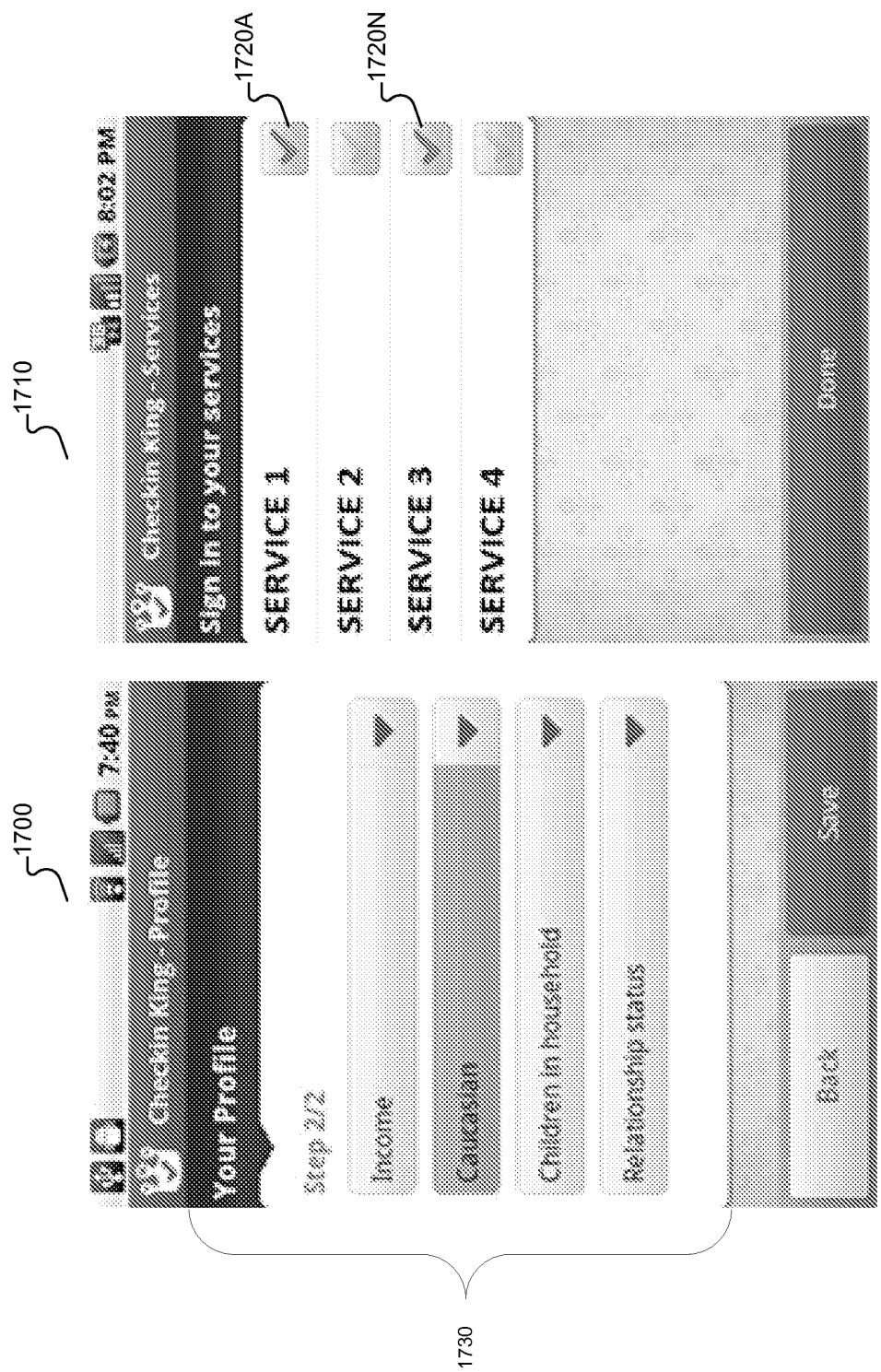

FIG. 17 depicts example user interfaces (1700 and 1710) whereby a user may configure a profile and service(s) to register a check-in. FIG. 17 illustrates an example user interface 1700 whereby a user may enter various personal characteristics 1730 to establish a profile in the data collection system. FIG. 17 illustrates another example user interface 1710 whereby a user may configure the services which may register a check-in. In one implementation of interface 1710, a user may toggle certain indicators (1720A-N) to select the default services that will register a check-in upon signing-in to the data collection system. In another implementation, a user may toggle the indicators to reflect the services in which a user has an account. Those skilled in the relevant art will appreciate that the user interfaces (1700 and 1710) may be configured in a variety of ways.

8. The Inference Pipeline

The inference pipeline takes as input a user's data collected by a mobile electronic device, recognizes when, where and for how long the user makes stops, generates possible places visited, and predicts the likelihood of the user visiting those places. The function of this pipeline is, given a user's information collected by a mobile electronic device, recognize whether a user visited a place, and if so, what is the probability the user is at a place, and how much time the user spent at the place. It also produces user location profiles which include information about users' familiar routes and places.

8.1 Data Input

The input to the inference pipeline is a sequence of location readings and sensor readings the mobile electronic device logged. There are three sources of locations: GPS, Wi-Fi and cell tower, and multiple types of sensors. Each location reading includes time stamp, location source, latitude, longitude, altitude, accuracy estimation, bearing and speed. Each sensor reading includes time stamp, type of sensor, and values.

The data collection system provides the data required for the inference pipeline.

8.2 Generating Models to Tune Data Collection

Various models in an inference pipeline can be used to tune the data collection strategy. Tuning helps maximize the quantity and quality of the data collected while minimizing the impact on the device resources like battery, processor, location data accuracy, etc.

The models in the inference pipeline instruct the data collection to increase the rate of data collection when higher data fidelity is required, and reduce the rate of data collection when data fidelity is not significant.

Another implementation of an Inference algorithm to improve the data accuracy is to apply a high rate of data collection when the device or application is turned on/awoken. Over time, the rate of data collection may decrease so as to maintain a high fidelity of data collection in the initial phase of a session of device usage. For example, the rate of data collection may initially be every tenth of a second for the first four minutes after the device is turned on; and then reduced to twice a minute thereafter.

Examples of how feedback from the inference pipeline is used to tune the rate of data collection includes:

1. Reducing data collection rate when a user is at home or at work
2. Reducing data collection rate when a location/area is not as accessible by GPS (e.g., downtown area)
3. Reducing data collection rate when a user is commuting (as detected by time or observation data)
4. Adjusting data collection rate in accordance to a user's schedule
5. Adjusting data collection rate in accordance to a user's history of visits (e.g., if a user does not typically go out for lunch, data collection rate is reduced at lunch time)

8.2.1 Improved Device Resource Utilization

In one implementation, inference generates a model that indicates when the user is at a location where in tracking location is not significant. An example of this model is the home/work model.

Home/work is incorporated to the data collection device. When a user is detected to be around home location or work location, a higher interval is used in data collection, to conserve device's resources, for example, battery and data transmission.

In another implementation, Inference models running on the device can detect user activity and situations that serve as indicators to increase or decrease the rate of data collection. Examples of these include:

1. Using device orientation and acceleration to determine the usage scenario of the device.
   a. Inclined and fast moving for a sustained period of time could imply driving
   b. Bouncing pattern could imply walking or running
2. Using in audible high frequency audio to detect the visit to a place
3. Using Bluetooth to detect the presence of a device in a place
4. Using temperature and light to detect probable location of the device
5. Using audio sensors to detect characteristic sounds like bus, airplane, music concerts, railway station, ocean, wind, climate (thunder, rain), mood (crowded market versus peaceful vacation), etc. to tune data collection strategy and provide valuable indicators to an inference pipeline 9. Conclusion Reference throughout this specification to features, advantages, or similar language does not imply that all of the features and advantages that may be realized with the present invention should be or are in any single implementation of the invention. Rather, language referring to the features and advantages is understood to mean that a specific feature, advantage, or characteristic described in connection with an implementation is included in at least one implementation of the present invention. Thus, discussion of the features and advantages, and similar language, throughout this specification may, but do not necessarily, refer to the same implementation.

Furthermore, the described features, advantages, and characteristics of the invention may be combined in any suitable manner in one or more implementations. One skilled in the relevant art will recognize that the invention can be practiced without one or more of the specific features or advantages of a particular implementation. In other instances, additional features and advantages may be recognized in certain implementations that may not be present in all implementations of the invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112, sixth paragraph, other aspects may likewise be embodied as a means-plus-function claim, or in other forms, such as being embodied in a computer-readable medium. (Any claims intended to be treated under 35 U.S.C. § 112, ¶6 will begin with the words "means for", but use of the term "for" in any other context is not intended to invoke treatment under 35 U.S.C. § 112, 916.) Accordingly, the applicant reserves the right to pursue additional claims after filing this application to pursue such additional claim forms, in either this application or in a continuing application.

The invention claimed is:

1. A method comprising:
   receiving a place query that includes location data from a client device, the location data of the place query identifying a current location of the client device;
   accessing a data source associated with the current location of the client device, the data source comprising contextual data that identifies a set of locations proximate to the current location of the client device;
   causing display of a presentation of the set of locations at the client device in response to the receiving the place query that includes the location data from the client device, the presentation of the set of locations comprising a known incorrect location;
   receiving a selection of at least a location from among the presentation of the set of locations; and
   validating the current location of the client device based on the user input.

2. The method of claim 1, wherein the receiving the place query includes:
receiving a response to a place survey associated with the current location of the client device.

3. The method of claim 1, wherein the location data is derived from at least one of the list comprising:
a geo-tagged image, a user profile, email, calendar appointment, call log, or Short Message Service (SMS) activity.

4. The method of claim 1, wherein the method further comprises:
associating the location from the selection to the location data responsive to the receiving the selection of the location from among the presentation of the set of locations.

5. The method of claim 1, wherein a portion of the set of location within the presentation of the set of locations comprise one or more incorrect locations.

6. The method of claim 1, wherein the presentation of the set of locations comprises a set of multiple choice selections.

7. The method of claim 1, wherein the causing display of the presentation of the set of locations includes:
determining a time of day; and
causing display of the presentation of the set of locations responsive to the determining the time of day.

8. The method of claim 1, wherein validating the current location further comprises, when the selection is the known incorrect location, identifying a user associated with the selection as providing false data.

9. A system comprising:
a memory; and
at least one hardware processor coupled to the memory and comprising instructions that causes the system to perform operations comprising:
receiving a place query that includes location data from a client device, the location data of the place query identifying a current location of the client device;
accessing a data source associated with the current location of the client device, the data source comprising contextual data that identifies a set of locations proximate to the current location of the client device;
causing display of a presentation of the set of locations at the client device in response to the receiving the place query that includes the location data from the client device, the presentation of the set of locations comprising a known incorrect location;
receiving a selection of at least a location from among the presentation of the set of locations; and
validating the current location of the client device based on the user input.

10. The system of claim 9, wherein the receiving the place query includes:
receiving a response to a place survey associated with the current location of the client device.

11. The system of claim 9, wherein the location data is derived from at least one of the list comprising:
a geo-tagged image, a user profile, email, calendar appointment, call log, or Short Message Service (SMS) activity.

12. The system of claim 9, wherein the instructions cause the system to perform operations further comprising:
associating the location from the selection to the location data responsive to the receiving the selection of the location from among the presentation of the set of locations.

13. The system of claim 9, wherein a portion of the set of location within the presentation of the set of locations comprise one or more incorrect locations.

14. The system of claim 9, wherein the presentation of the set of locations comprises a set of multiple choice selections.

15. The system of claim 9, wherein the causing display of the presentation of the set of locations includes:
determining a time of day; and
causing display of the presentation of the set of locations responsive to the determining the time of day.

16. A non-transitory machine-readable storage medium comprising instructions that, when executed by one or more processors of a machine, cause the machine to perform operations including:
receiving a place query that includes location data from a client device, the location data of the place query identifying a current location of the client device;
accessing a data source associated with the current location of the client device, the data source comprising contextual data that identifies a set of locations proximate to the current location of the client device;
causing display of a presentation of the set of locations at the client device in response to the receiving the place query that includes the location data from the client device, the presentation of the set of locations comprising a known incorrect location;
receiving a selection of at least a location from among the presentation of the set of locations; and
validating the current location of the client device based on the user input.

17. The non-transitory machine-readable storage medium of claim 16, wherein the receiving the place query includes:
receiving a response to a place survey associated with the current location of the client device.

18. The non-transitory machine-readable storage medium of claim 16, wherein the location data is derived from at least one of the list comprising: a geo-tagged image, a user profile, email, calendar appointment, call log, or Short Message Service (SMS) activity.

19. The non-transitory machine-readable storage medium of claim 16, wherein the instructions cause the machine to perform operations further comprising:
associating the location from the selection to the location data responsive to the receiving the selection of the location from among the presentation of the set of locations.

20. The non-transitory machine-readable storage medium of claim 16, wherein a portion of the set of location within the presentation of the set of locations comprise one or more incorrect locations.

* * * * *